United States Patent
Roberts et al.

(10) Patent No.: US 9,558,788 B2
(45) Date of Patent: Jan. 31, 2017

(54) SYSTEMS AND METHODS OF PROVIDING USER INTERFACE FEATURES FOR A MEDIA SERVICE

(71) Applicant: Verizon and Redbox Digital Entertainment Services, LLC, Basking Ridge, NJ (US)

(72) Inventors: Brian F. Roberts, Dallas, TX (US); Christina S. Siegfried, Irving, TX (US); Ann Gordon Prather, Dallas, TX (US)

(73) Assignee: Verizon and Redbox Digital Entertainment Services, LLC, Basking Ridge, NJ (US)

( * ) Notice: Subject to any disclaimer, the term of this patent is extended or adjusted under 35 U.S.C. 154(b) by 66 days.

(21) Appl. No.: 14/141,908

(22) Filed: Dec. 27, 2013

(65) Prior Publication Data

US 2015/0020091 A1   Jan. 15, 2015

Related U.S. Application Data

(60) Provisional application No. 61/846,603, filed on Jul. 15, 2013.

(51) Int. Cl.

| | |
|---|---|
| *H04H 60/33* | (2008.01) |
| *G11B 27/28* | (2006.01) |
| *H04N 9/79* | (2006.01) |
| *G11B 27/02* | (2006.01) |
| *H04N 21/47* | (2011.01) |
| *H04N 21/482* | (2011.01) |

(Continued)

(52) U.S. Cl.
CPC ............. *G11B 27/28* (2013.01); *G06F 3/0482* (2013.01); *G06F 3/0484* (2013.01); *G06F 3/04842* (2013.01); *G06F 17/30861* (2013.01); *G06Q 20/18* (2013.01); *G06Q 30/0255* (2013.01); *G11B 27/02* (2013.01); *H04L 65/601* (2013.01); *H04N 5/76* (2013.01); *H04N 7/163* (2013.01); *H04N 9/7921* (2013.01); *H04N 21/2387* (2013.01); *H04N 21/252* (2013.01); *H04N 21/26258* (2013.01); *H04N 21/26283* (2013.01); *H04N 21/458* (2013.01); *H04N 21/47* (2013.01); *H04N 21/47202* (2013.01); *H04N 21/482* (2013.01); *H04N 21/4825* (2013.01); *H04N 21/4826* (2013.01); *H04N 21/4828* (2013.01); *H04N 21/6587* (2013.01); *H04N 21/8456* (2013.01); *H04N 21/8549* (2013.01)

(58) Field of Classification Search
CPC ........... H04H 60/33; G06F 3/048; G06F 15/16
See application file for complete search history.

(56) References Cited

U.S. PATENT DOCUMENTS

| | | | |
|---|---|---|---|
| 2004/0168052 A1* | 8/2004 | Clisham et al. | 713/153 |
| 2011/0072452 A1* | 3/2011 | Shimy et al. | 725/25 |

(Continued)

*Primary Examiner* — Brian Yenke
*Assistant Examiner* — Samira Monshi

(57) ABSTRACT

In an exemplary method, a computer-implemented media service system provides a graphical user interface view associated with a first functional area of the media service for display on a display screen, detects a peek request input while the graphical user interface view is displayed, and provides, in response to the peek request input and for display with the graphical user interface view, an activity indicator indicating a tracked activity associated with the second functional area of the media service. Corresponding systems and methods are also described.

21 Claims, 15 Drawing Sheets

(51) Int. Cl.
*G06Q 20/18* (2012.01)
*G06Q 30/02* (2012.01)
*G06F 3/0484* (2013.01)
*H04L 29/06* (2006.01)
*G06F 3/0482* (2013.01)
*H04N 21/472* (2011.01)
*H04N 21/262* (2011.01)
*H04N 21/458* (2011.01)
*H04N 7/16* (2011.01)
*H04N 21/2387* (2011.01)
*H04N 21/6587* (2011.01)
*H04N 21/25* (2011.01)
*H04N 21/845* (2011.01)
*H04N 21/8549* (2011.01)
*H04N 5/76* (2006.01)
*G06F 17/30* (2006.01)

(56) References Cited

U.S. PATENT DOCUMENTS

| | | | |
|---|---|---|---|
| 2012/0030227 A1* | 2/2012 | Mital et al. | 707/767 |
| 2013/0145269 A1* | 6/2013 | Latulipe et al. | 715/720 |
| 2013/0332250 A1* | 12/2013 | Armaly | H04N 21/252 |
| | | | 705/14.23 |

* cited by examiner

SYSTEMS AND METHODS OF PROVIDING USER INTERFACE FEATURES FOR A MEDIA SERVICE

RELATED APPLICATIONS

The present application claims priority under 35 U.S.C. §119(e) to U.S. Provisional Patent Application No. 61/846,603, filed Jul. 15, 2013. The contents of the provisional patent application are hereby incorporated by reference in their entirety.

BACKGROUND INFORMATION

There are diverse ways for people to find and consume media programs. For example, a person wanting to watch a media program such as a movie may utilize a video distribution service such as a video rental or purchase service ("video service") to find, access, and watch a movie. The video distribution service may allow the person to rent or purchase a physical copy of the movie from a local video store or video vending kiosk, or to rent or purchase a digital copy of the movie through an online video service, which may stream or download the digital copy of the movie to a user computing device for playback to the user.

Such a video distribution service typically provides service features for use by an end user of the video distribution service to discover, access, and consume video programs. While a conventional video distribution service provides useful features, there remains room for new and/or improved features that may further benefit users of the service, a provider of the service, and/or third parties such as content providers and/or advertisers.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF PREFERRED EMBODIMENTS

Exemplary systems and methods of providing user interface features for a media service are described herein. The "media service" may include any service provided by a service provider and through which an end user of the media service may discover, access, and/or consume media content and/or information associated with the media content. The media service may include one or more features for use by the user to discover, access, and/or consume media content and/or information associated with the media content.

The exemplary systems and methods described herein may provide one or more user interfaces associated with the media service. Such user interfaces may be referred to as "media service user interfaces" and may include any types of user interfaces suitable for facilitating user interaction with the media service. Through a media service user interface, a user of the media service may access one or more features of the media service. Examples of such user interfaces may include, without limitation, graphical user interfaces ("GUIs"), communication interfaces (e.g., communication service interfaces such as text-messaging interfaces, electronic mail interfaces, social networking messaging interfaces, and/or another form of communication interfaces), and/or other types of user interfaces associated with the media service.

A media service user interface may include one or more user interface features for the media service. A "user interface feature" may refer to any feature included in a media service user interface and configured for use by a user to interact with the media service and/or one or more features of the media service. Examples of media service user interfaces and media service user interface features are described herein.

The systems, methods, user interfaces, and/or user interface features described herein may benefit end users of a media service, a provider of the media service, and/or one or more third parties (e.g., media content providers, advertisers, etc.). For example, one or more of the user interface features described herein may assist a user of the media service with accessing information related to the media service and/or with discovering, accessing, and/or consuming media content and/or information associated with the media content through the media service. These and other benefits that may be provided by systems, methods, user interfaces, and/or user interface features described herein will be made apparent by the following detailed description. Exemplary systems and methods of providing user interface features for a media service will now be described in reference to the accompanying drawings.

Figure 1:
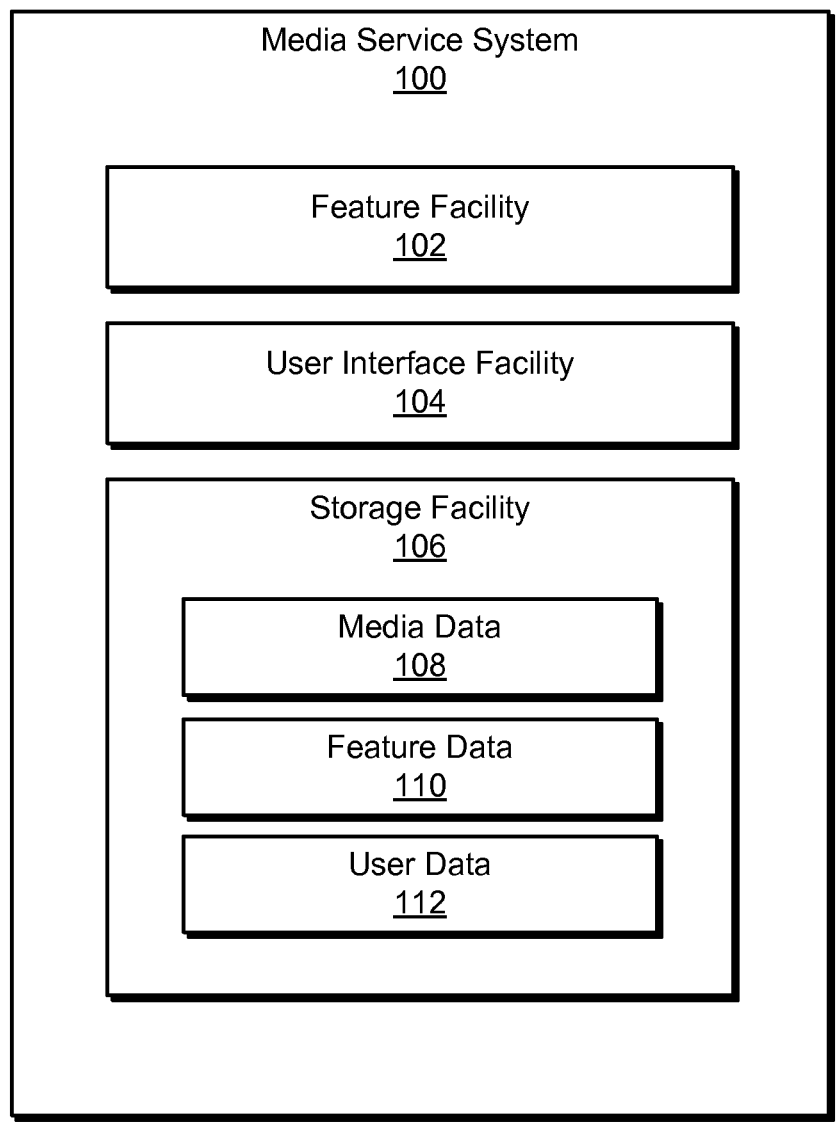
FIG. 1 illustrates an exemplary media service system according to principles described herein.

FIG. 1 illustrates an exemplary media service system 100 ("system 100") configured to provide a media service and/or one or more features of a media service to one or more end users of the media service (e.g., one or more subscribers to the media service). The media service may include any service that provides end users of the service with one or more features configured to facilitate user discovery, access, and/or consumption of media content and/or information associated with the media content. System 100 may be associated with (e.g., operated by) a provider of the media service ("service provider").

As shown, system 100 may include, without limitation, a feature facility 102, a user interface facility 104, and a storage facility 106 selectively and communicatively coupled to one another. It will be recognized that although facilities 102-106 are shown to be separate facilities in FIG. 1, any of facilities 102-106 may be combined into fewer facilities, such as into a single facility, or divided into more facilities as may serve a particular implementation. For example, feature facility 102 may be divided into any number of facilities configured to provide any number of features of a media service. Additionally or alternatively, one or more of the facilities 102-106 may be omitted from and/or external to system 100 in other implementations. For example, storage facility 106 may be external of and communicatively coupled to system 100 in certain alternative implementations. Facilities 102-106 of system 100 may include or be otherwise implemented by one or more computing devices configured to perform one or more of the operations described herein. In such implementations, system 100 may be referred to as a computer-implemented system 100.

Storage facility 106 may be configured to store data generated and/or used by feature facility 102 and/or user interface facility 104. For example, storage facility 106 may store media data 108 representative of media content that is discoverable and/or accessible through a media service. As used herein, the term "media content" may refer to any form of media that may be distributed through a media service and discovered, accessed, and/or consumed by a user of the media service. Media content may include discrete instances of media, which may be referred to as media programs. The term "media program" may refer to any television program, on-demand media program, pay-per-view media program, broadcast media program (e.g., broadcast television program), multicast media program (e.g., multicast television program), narrowcast media program (e.g., narrowcast video-on-demand program), IPTV media program, advertisement, video, movie, audio program, radio program, or any other media program that a user may access by way of the media service. Such media programs that are made available for user consumption through a media service may be accessed and/or played back by an appropriately configured user computing device (e.g., a media player device) for presentation to a user.

Media data 108 may represent actual content included in media content and/or information about the media content. For example, media data 108 may include metadata (e.g., information about genre, cast, title, playback duration, release date, etc.) and/or enriched metadata (e.g., user-defined tags, ratings, etc.) for the media content. In certain examples, media data 108 may represent information about media programs included in a repository of on-demand media content and distributed by way of a digital distribution channel (e.g., streaming or downloading over a network) and/or physical copies of media programs distributed by way of a physical distribution channel (e.g., a media vending kiosk distribution channel).

Storage facility 106 may include feature data 110 associated with one or more features of the media service. Feature data 110 may be used and/or generated by feature facility 102 and/or user interface facility 104. Storage facility 106 may include user data 112 associated with one or more end users of a media service, such as data representing user profiles of the users. Storage facility 106 may store additional or alternative data as may serve a particular implementation.

Data stored by storage facility 106 may be accessed by system 100 from any suitable source, including a source internal or external to system 100. Storage facility 106 may permanently or temporarily store data. In certain examples, system 100 may access certain data from a source external to system 100 and temporarily store the data in storage facility 106 for use by feature facility 102 and/or user interface facility 104. In certain examples, data generated by feature facility 102 and/or user interface facility 104 may be stored permanently or temporarily to storage facility 106.

Feature facility 102 may be configured to perform one or more operations to provide one or more features of a media service. The features may include any features configured for use by a user of the media service to discover, access, and/or consume media content and/or information associated with the media content.

In certain examples, features of the media service may be divided into separate functional areas of the media service. A "functional area" of the media service may be any defined area within the media service that is logically separate from one or more other areas within the media service for purposes of one or more operations performed by feature facility 102 and/or user interface facility 104.

Conventionally, a user of the media service interacts with one functional area of the media service at a time. This typically requires the user to leave one functional area to interact with another functional area. However, in certain examples, exemplary systems and methods described herein may allow a user who is interacting with a first functional area of the media service to access information about a second functional area of the media service and/or interact with the second functional area of the media service without leaving or interrupting interaction with the first functional area of the media service, such as described herein.

Figure 2:
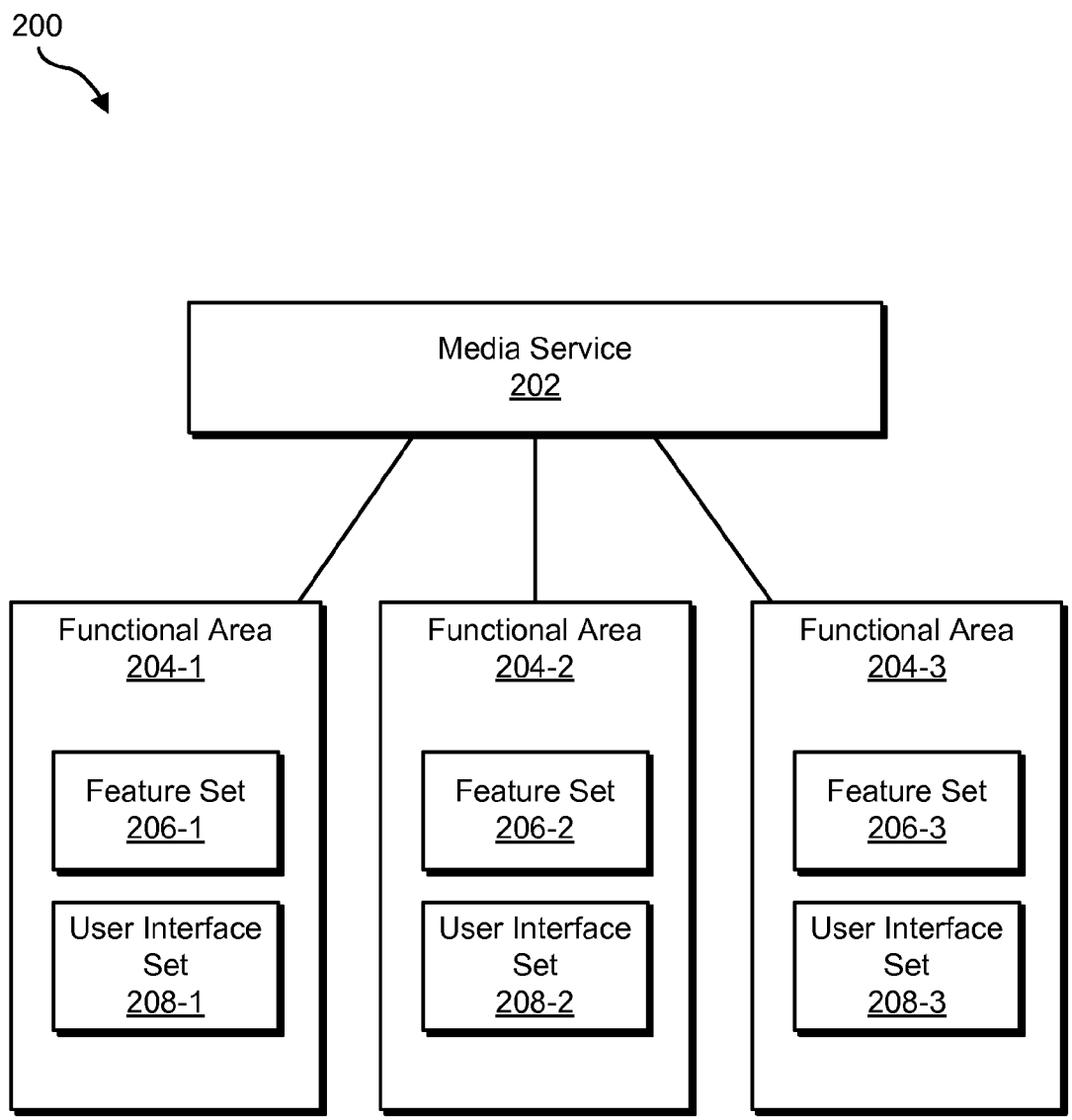
FIG. 2 illustrates exemplary functional areas of a media service according to principles described herein.

To further illustrate functional areas of a media service, FIG. 2 shows an exemplary configuration 200 in which a media service 202 includes separate functional areas 204 (e.g., functional areas 204-1 through 204-3). As shown, features and user interfaces of the media service 202 may be divided into separate sets within the functional areas 204. For example, features of the media service 202 may be divided into separate feature sets 206 (e.g., feature sets 206-1 through 206-3), and user interfaces of the media service 202 may be divided into separate user interface sets 208 (e.g., user interface sets 208-1 through 208-3) respectively corresponding to the functional areas 204 of the media service 202.

Functional area 204-1 may include feature set 206-1 that includes a set of features of the media service 202 corresponding to functional area 204-1. Functional area 204-1 may also include user interface set 208-1 that includes a set of user interfaces corresponding to functional area 204-1. Functional area 204-2 may include feature set 206-2 that includes a set of features of the media service 202 corresponding to functional area 204-2 and user interface set 208-2 that includes a set of user interfaces corresponding to functional area 204-2. Functional area 204-3 may include feature set 206-3 that includes a set of features of the media service 202 corresponding to functional area 204-3 and user interface set 208-3 that includes a set of user interfaces corresponding to functional area 204-3.

The division of the media service 202 into functional areas 204 may compartmentalize features and/or user interfaces of the media service 202 in a manner that is based on and/or supports a particular implementation of the media service 202 and/or in a manner that facilitates convenient and/or intuitive user interaction with the media service 202. The functional areas 204 may be mapped to any compartmentalized areas of the media service 202 as may suit a particular application.

To illustrate, in certain examples, functional area 204-1 may correspond to a media-on-demand component of the media service 202, functional area 204-2 may correspond to a physical-media-distribution component such as a media-vending-kiosk component of the media service 202, and functional area 204-3 may correspond to a media-consumption-planning component of the media service 202. In such examples, feature set 206-1 may include a set of features associated with the media-on-demand component of the media service 202, user interface set 208-1 may include a set of user interfaces associated with the media-on-demand component of the media service 202, feature set 206-2 may include a set of features associated with the media-vending-kiosk component of the media service 202, user interface set 208-2 may include a set of user interfaces associated with the media-vending-kiosk component of the media service 202, feature set 206-3 may include a set of features associated with the media-consumption-planning component of the media service 202, and user interface set 208-3 may include a set of user interfaces associated with the media-consumption-planning component of the media service 202.

In certain examples, one functional area 204 at a time may be assigned an active status. For example, functional area 204-1 may have an active status at a given time, meaning that functional areas 204-2 and 204-3 do not have the active status at the given time. When assigned the active status, the functional area 204-1 may be active for user interaction. For example, one or more features in feature set 206-1 and/or one or more user interfaces in user interface set 208-1 may be actively provided to a user when functional area 204-1 has the active status. To illustrate, when functional area 204-1 has the active status, user interface facility 104 may provide a GUI view included in user interface set 208-1 for display on a display screen such that the user may interact with the GUI view. For instance, when the user is interacting with a media-on-demand component of the media service 202, functional area 204-1 may be active, and user interface facility 104 may provide a GUI view included in user interface set 208-1 for display on a display screen such that the user may interact with the media-on-demand component of the media service 202 through the GUI view.

User interface facility 104 may be configured to perform one or more operations to provide one or more user interfaces associated with a media service. For example, user interface facility 104 may be configured to provide a user interface through which users of the media service may access and interact with the media service to discover, access, and consume media content and/or information associated with the media content. The user interface may be in any suitable form. For example, user interface facility 104 may be configured to provide a website, a client application user interface (e.g., a user interface provided by a client application such as a "mobile app" installed and running on a user computing system), a media player user interface, a GUI, a communications interface, and/or any other form of user interface configured to facilitate interaction with the media service. A user interface provided by user interface facility 104 may include any of the exemplary GUI views described herein. User interface facility 104 may interact with feature facility 102 and/or storage facility 106 to access and use data to provide a user interface.

Figure 3:
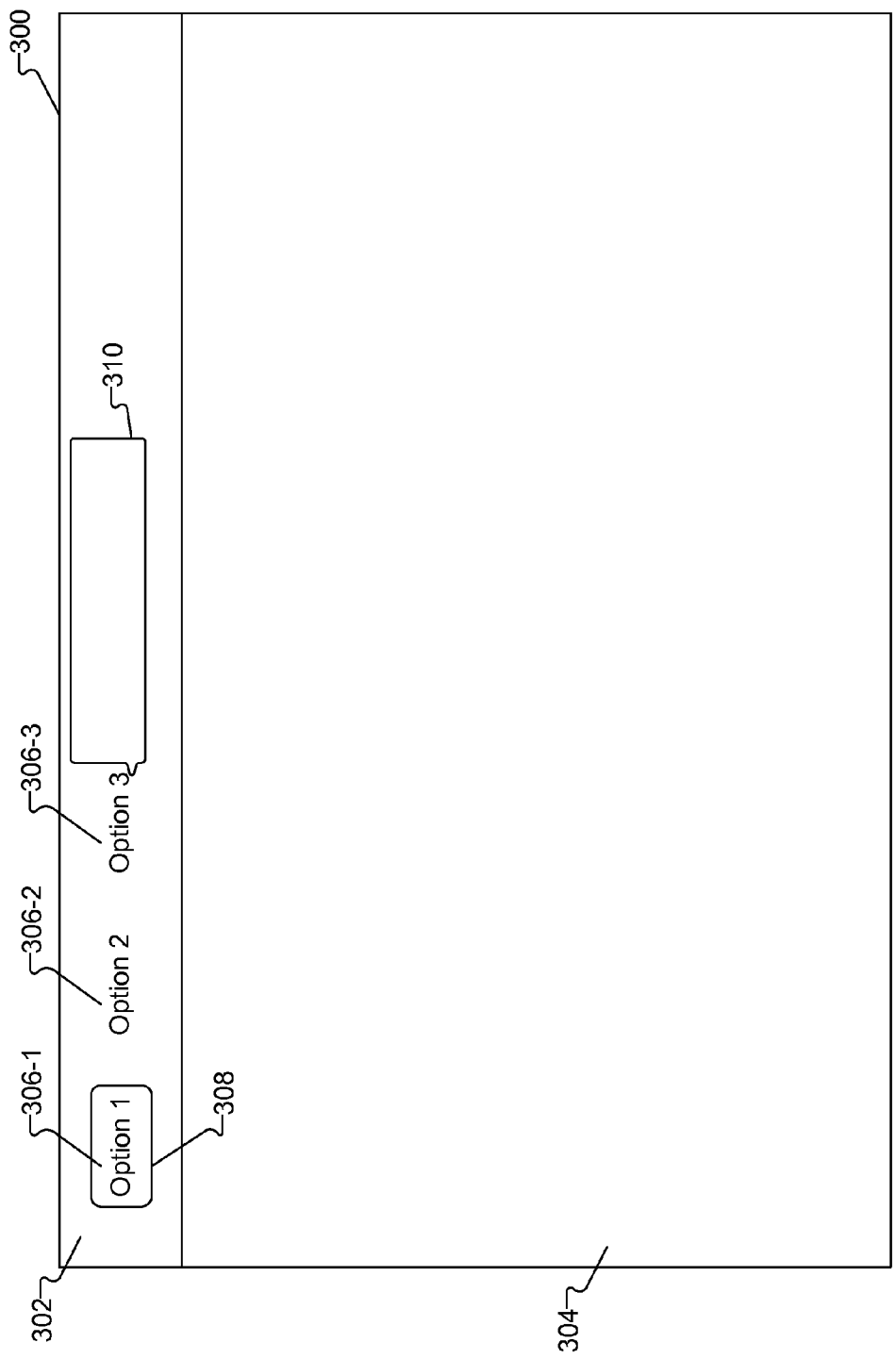
FIG. 3 illustrates an exemplary graphical user interface view according to principles described herein.

FIG. 3 illustrates an exemplary GUI view 300 that may be provided by user interface facility 104 for display on a display screen. GUI view 300 may correspond to and be provided for display when a particular functional area 204 has the active status. For example, GUI view 300 may correspond to functional area 204-1, be included in user interface set 208-1, and be provided by user interface facility 104 for display when functional area 204-1 has the active status.

As shown, GUI view 300 may include a header area 302 and a main area 304. The main area 304 may include user interface content related to the active functional area 204. For example, when the active functional area 204 corresponds to a media-on-demand component of the media service 202, the main area 304 may include user interface content related to media-on-demand features and/or content (e.g., a playback of an on-demand media program).

The header area 302 may include a menu of navigational options 306 (e.g., navigational options 306-1, 306-2, and 306-3 labeled "Option 1," "Option 2," and "Option 3," respectively). Navigational options 306 may respectively correspond to the functional areas 204 of the media service 202. For example, navigational option 306-1 may represent functional area 204-1, navigational option 306-2 may represent functional area 204-2, and navigational option 306-3 may represent functional area 204-3.

A user may provide input in GUI view 300 to select a navigational option 306 to activate the functional area 204 represented by the navigational option 306, and system 100 may respond by assigning the active status to the functional area 204. In FIG. 3, GUI view 300 includes an active status indicator 308 indicating that the functional area 204-1 represented by navigational option 306-1 has the active status. If the user provides input to select navigational option 306-2, the system 100 may reassign the active status from functional area 204-1 to functional area 204-2. In conjunction with the reassignment of the active status, user interface facility 104 may provide another GUI view corresponding to functional area 204-2 for display in place of GUI view 300. The GUI view corresponding to functional area 204-2 may include the menu of navigation options 306 in the header area 302, with the active status indicator 308 repositioned to indicate that the functional area 204-2 represented by navigational option 306-2 has the active status. The GUI view corresponding to functional area 204-2 may include, in the main area 304, different user interface content that corresponds to functional area 204-2.

While GUI view 300 is displayed, instead of a user providing input to move the active status away from the functional area 204-1 represented by navigational option 306-1, the user may provide a different type of user input to indicate a request to peek in on activity information of a functional area 204 of the media service 202. This type of user input may be referred to as "peek request" input and may be predefined for use by a user to indicate a request to peek in on activity information associated with a functional area 204 of the media service 202. Peek request input may include any suitable type of user input that is different from user input that may be provided by a user to select to move the active status to a functional area 204 of the media service 202. For example, peek request input may include a hovering of a cursor over a navigational option 306, a touch-and-hold of a user's finger or other input mechanism on a navigational option 306 displayed on a touchscreen display, or any other suitable predefined input provided relative to a navigational option 306.

User interface facility 104 may detect a peek request input associated with a navigational option 306 and respond by providing an activity indicator indicating one or more activities associated with the functional area 204 represented by the navigational option 306. For example, in response to a detection of peek request input associated with navigational option 306-3, user interface facility 104 may provide, for display together with GUI view 300 (e.g., within GUI view 300) an activity indicator 310 indicating an activity associated with the functional area 204-3 represented by navigational option 306-3, as shown in FIG. 3.

To facilitate a display of an activity indicator (e.g., activity indicator 310) that indicates an activity of a functional area 204 of the media service 202, system 100 may track activities of the media service 202. For example, system 100 (e.g., feature facility 102 and/or user interface facility 104) may be configured to detect certain predefined types of activities of the media service 202 and maintain data representative of the tracked activities for use by user interface facility 104 to provide an activity indicator that indicates a tracked activity of a functional area 204 of the media service 202.

As used herein, an "activity" of the media service 202 may include any operation or operations associated with the media service 202. The operations may be performed by system 100, a user interacting with the media service 202 (e.g., through a media service user interface), a provider of the media service 202, and/or any other entity in relation to the media service 202.

Accordingly, in certain examples, a tracked activity may include an interaction of a user with the media service 202. The interaction may be performed by any user, including the same user to whom GUI view 300 is presented or a different end user of the media service 202 (e.g., a friend, social contact, or other user having an association with the user to whom GUI view 300 is presented). The interaction of the user with the media service may include an interaction with a media program through the media service 202, an interaction with a user interface of the media service 202, and/or any other interaction with the media service 202.

Additionally or alternatively, in certain examples, a tracked activity may include an operation performed by system 100, such as an updating of a catalogue of media programs accessible through the media service 202, a tracking of dates associated with activities of the media service 202 (e.g., due dates for returns of rented media programs), and/or any other operation performed by system 100.

Examples of activities of the media service 202 may include, without limitation, marking of a media program as being of interest to a user (e.g., in response to the user providing input to bookmark the media program), tagging of a media program, rating of a media program, accessing of a media program (e.g., downloading, streaming, renting, purchasing, etc. of the media program by the user), consuming of a media program (e.g., playing back the media program for user consumption), returning of a media program by a user (e.g., returning of a rented physical copy of the media program to a media vending kiosk), user interactions with a media service user interface (e.g., a user accessing a specific GUI view and/or feature such as a shopping cart or checkout feature), accessing of a feature of the media service 202 by a user, performing of an operation for a new availability of a media program through the media service 202 (e.g., releasing of a media program for access through the media service 202 or scheduling an upcoming release of a media program for access through the media service 202), reserving of a media program for access by a user, recommending of a media program, sharing of a media program between users, scheduling of an activity of the media service 202 (e.g., scheduling of a media program consumption or recording event), recording of a media program, scheduled actual or virtual playback of a media program, passing of time related to a scheduled event (e.g., a passing of time relative to an upcoming or past scheduled event such as a due date for return of a rented physical copy of a media program to a media vending kiosk), and/or any other activities associated with the media service 202.

An activity of the media service 202 may be specific to a particular functional area 204 of the media service 202. For example, an activity related to a media-on-demand operation of the media service 202 may be associated with a media-on-demand functional area 204 of the media service 202. To illustrate, an activity of the media service 202 may include a user interaction with a media program by way of a particular functional area 204 of the media service 202 or with a GUI view associated with the particular functional area 204 of the media service 202. Accordingly, system 100 may track activities of the media service 202 in relation to the functional areas 204 of the media service 202.

User interface facility 104 may use one or more tracked activities of a functional area 204 of the media service 202 to provide an activity indicator indicating an activity associated with the functional area 204, thereby providing a user with a peek into a tracked activity of the functional area 204. For example, user interface facility 104 may be configured to process data representative of tracked activities and select one or more particular activities and/or information associated with the tracked activities to indicate in an activity indicator. User interface facility 104 may make such a selection in any suitable way and based on any suitable predefined criteria, as may suit a particular implementation.

Figure 4:
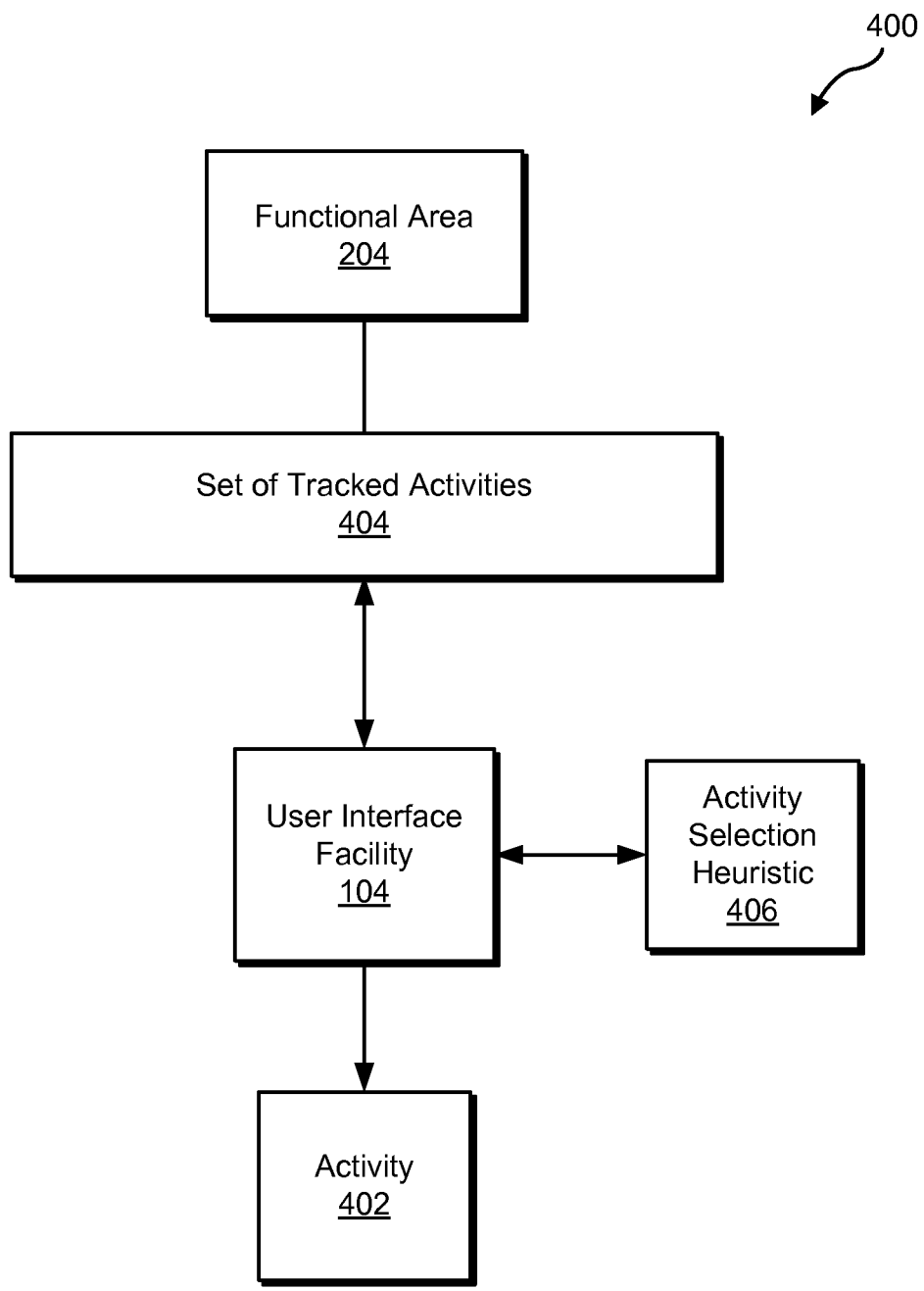
FIG. 4 illustrates an exemplary selection of an activity associated with a functional area of a media service according to principles described herein.

FIG. 4 illustrates a selection 400 of an activity 402 from a set of tracked activities 404 of a functional area 204 of the media service 202. As shown, user interface facility 104 may access and use the set of tracked activities 404 and an activity selection heuristic 406 to select the activity 402 to be indicated by an activity indicator. The activity selection heuristic 406 may be predefined to specify criteria to be used by user interface facility 104 to select an activity from a set of tracked activities. Accordingly, the activity selection heuristic may be defined, e.g., by a provider of the media service 202 and/or by customization input from an end user of the media service 202, to govern what activity or activities (e.g., what type of activity is selected and/or how activities will be prioritized for selection) will be selected. In certain examples, the selection 400 may be performed in advance of or dynamically in response to receipt of peek request input.

User interface facility 104 may provide an activity indicator indicating the selected activity 402 of the functional area 204 of the media service 202. The activity indicator, such as activity indicator 310 shown in FIG. 3, may be in any suitable form that may be displayed together with a displayed GUI view, such as GUI view 300, and that may facilitate a user peeking in on information about a functional area 204 of the media service 202 without leaving the displayed GUI view and/or without interrupting a current user interaction with the media service 202. In FIG. 3, activity indicator 310 includes a pop-up window displayed adjacent to the navigational option 306-3 representing the functional area 204-3. Activity indicator 310 may be in any other suitable form in other examples.

User interface facility 104 may populate an activity indicator, such as activity indicator 310, with content indicating the selected activity 402. The content may include any suitable form of user interface content that indicates the selected activity 402 of the corresponding functional area 204 of the media service 202. For example, the content may include textual and/or graphical content indicating the selected activity 402 of the functional area 204. In certain examples, the content may include a text string, a graphical symbol, a thumbnail image, and/or a mini-GUI view that indicates the selected activity 402 of the functional area 204.

The content may directly or indirectly indicate the selected activity 402 of the functional area 204. As an example, the content may include textual content directly indicating that the selected activity 402 is a specific accessing of a particular media program by a user (e.g., a textual message indicating that another user of the media service 202 has accessed the media program). As another example, the content may include a thumbnail image of the last GUI view accessed by a user in the functional area 204, which may indirectly indicate that the selected activity 402 is an accessing of the GUI view by a user (e.g., as accessed by the user when the functional area 204 last had the active status).

In certain examples, the activity indicator may include a reminder associated with the selected activity 402. For example, the activity indicator may include content configured to remind a user of the selected activity 402 and/or one or more events associated with the selected activity 402. To illustrate one example, the selected activity 402 may include a rental of a physical copy of a media program, and the activity indicator may include a reminder of an upcoming return due data for the media program or that a return of the media program is overdue. To illustrate another example, the selected activity 402 may include a user interaction indicating that a media program is of interest to a user, and the activity indicator may include a reminder that the media program is of interest to the user and/or of an availability of the media program for access by the user (e.g., at a scheduled release date and/or distribution time slot).

In certain examples, the activity indicator may indicate a last state of a functional area 204 of the media service 202, the last state being associated with the selected activity 402. For example, the selected activity 402 may include an accessing by a user of a particular GUI view and/or an interaction with the GUI view, and the activity indicator may indicate the last state of a functional area 204 of the media service 202 being the state of the functional area 204 of the media service 202 at the time of the accessing of a particular GUI view and/or the interaction with the GUI view. In certain examples, the activity indicator may include an image (e.g., a thumbnail image) of the GUI view that is representative of the last state of the functional area 204 of the media service 202.

In certain examples, user interface facility 104 may be configured to provide, in a user interface, a notification indicating an availability of an activity indicator associated with a functional area 204 of the media service 202. User interface facility 104 may provide the notification before or without detecting peek request input in order to notify a user that the activity indicator is available for the functional area 204. This may allow the user to ascertain that an activity has occurred within the functional area 204 and provide peek request input if the user wants to peek in and learn what activity has occurred in the functional area 204.

Figure 5:
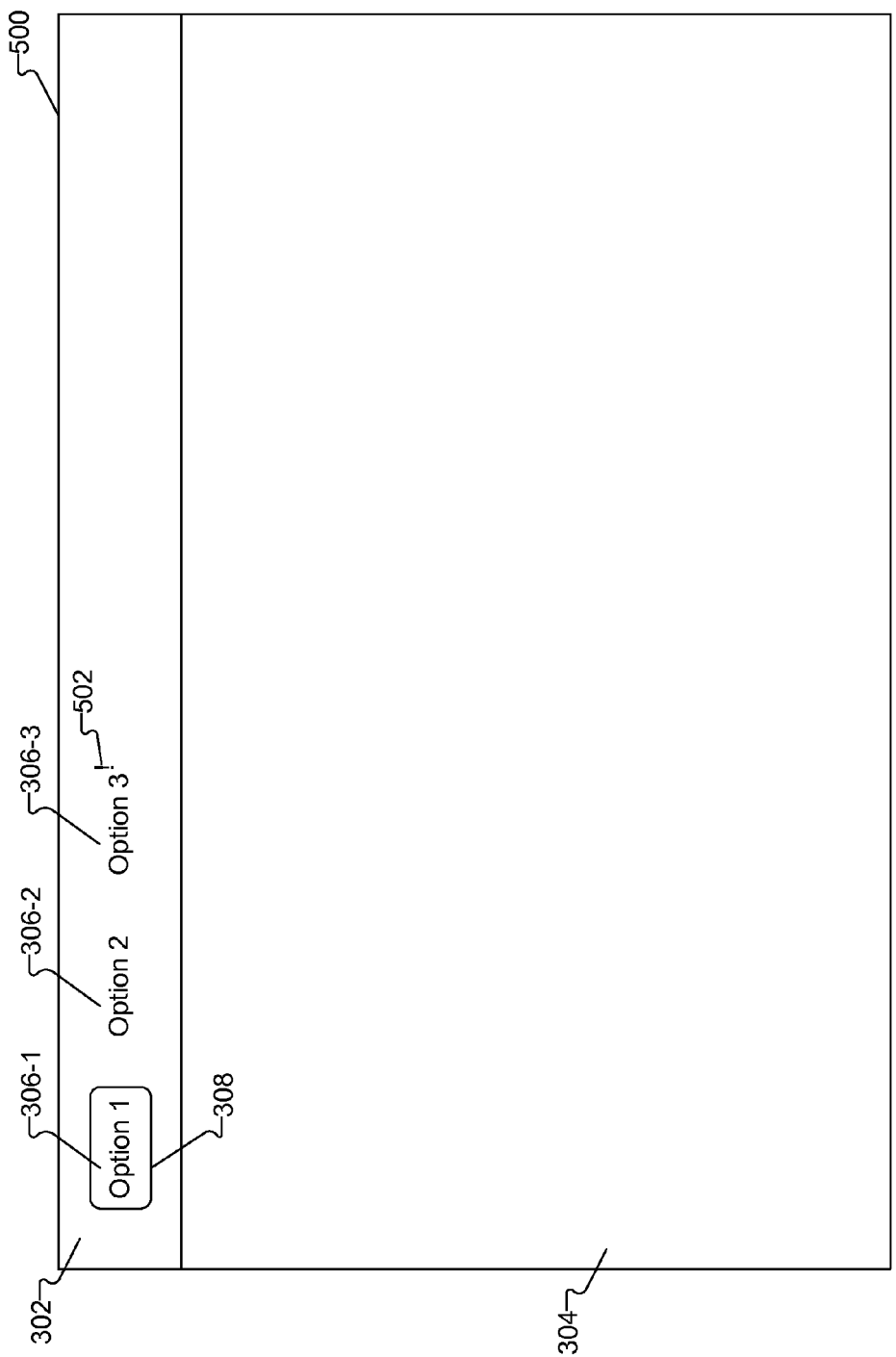
FIGS. 5-9 illustrate exemplary graphical user interface views according to principles described herein.

FIG. 5 illustrates an exemplary GUI view 500 that may be provided for display on a display screen. GUI view 500 may be similar to GUI view 300 except that activity indicator 310 is not displayed in GUI view 500 and a notification 502 indicating an availability of an activity indicator associated with a functional area 204 of the media service 202 is displayed in GUI view 500 in association with (e.g., adjacent to) navigational option 306-3. A user viewing GUI view 500 may ascertain from notification 502 that an activity has occurred within the functional area 204-3 represented by navigational option 306-3. The user may provide peek request input associated with navigational option 306-3, and, in response, user interface facility 104 may provide an activity indicator for display in GUI view 500, such as is represented by GUI view 300 in FIG. 3.

Examples of activity indicators will now be described in relation to an exemplary context in which the media service 202 is divided into three specific functional areas 204 represented by three navigational options in a main navigational menu of an exemplary GUI view, and in which the activity indicators are provided for display together with the GUI view. The examples are illustrative only.

Figure 6:
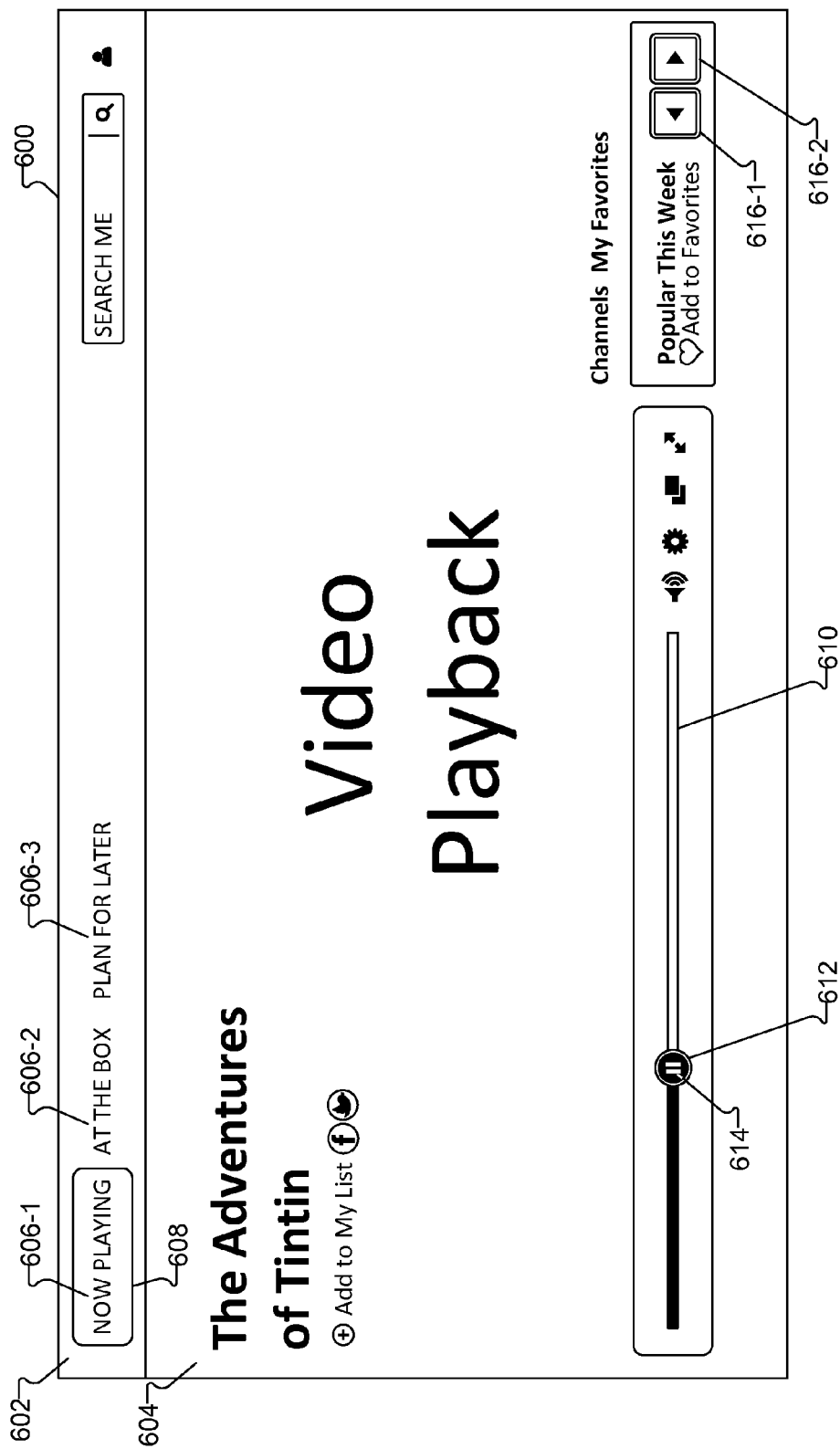

FIG. 6 illustrates an exemplary GUI view 600 associated with a particular functional area 204 of the media service 202 and provided for display when the functional area 204 has the active status. As shown, GUI view 600 may include a header area 602 and a main area 604. The main area 604 may include user interface content related to the functional area 204 having the active status. For example, the functional area 204 may be associated with features of the media service 202 for accessing and consuming on-demand media content, such as features for playing back an on-demand media program, and main area 604 may include a playback area in which the media program is played back, as shown in FIG. 6.

The header area 602 may include a menu of navigational options 606 (e.g., navigational options 606-1, 606-2, and 606-3 labeled "Now Playing," "At the Box," and "Plan for Later," respectively). Navigational options 606 may respectively correspond to the functional areas 204 of the media service 202. For example, navigational option 606-1 may represent functional area 204-1 associated with a set of features 206-1 for accessing and playing back on-demand media content, navigational option 606-2 may represent functional area 204-2 associated with a set of features 206-2 for accessing physical copies of media programs from a media vending kiosk system, and navigational option 606-3 may represent functional area 204-3 associated with a set of features 206-3 for planning for future consumption of media content through the media service 202.

In FIG. 6, GUI view 600 includes an active status indicator 608 indicating that the functional area 204-1 represented by the "Now Playing" navigational option 606-1 has the active status. In certain examples, user interface facility 104 may provide GUI view 600 for display when the functional area 204-1 has the active status. With GUI view 600 displayed as shown in FIG. 6, a user may provide peek request input associated with any of the navigational options 606 to request to peek in on information associated with the functional area 204 of the media service 202 represented by the navigational option 606.

To illustrate, the user may provide peek request input associated with navigational option 606-2 to request to peek in on information associated with the media-vending-kiosk functional area 204-2 of the media service 202 represented by the "At the Box" navigational option 606-2. User interface facility 104 may detect the peek request input and respond by providing an activity indicator for display in GUI view 600, the activity indicator indicating an activity associated with the media-vending-kiosk functional area 204-2 of the media service 202.

Figure 7:
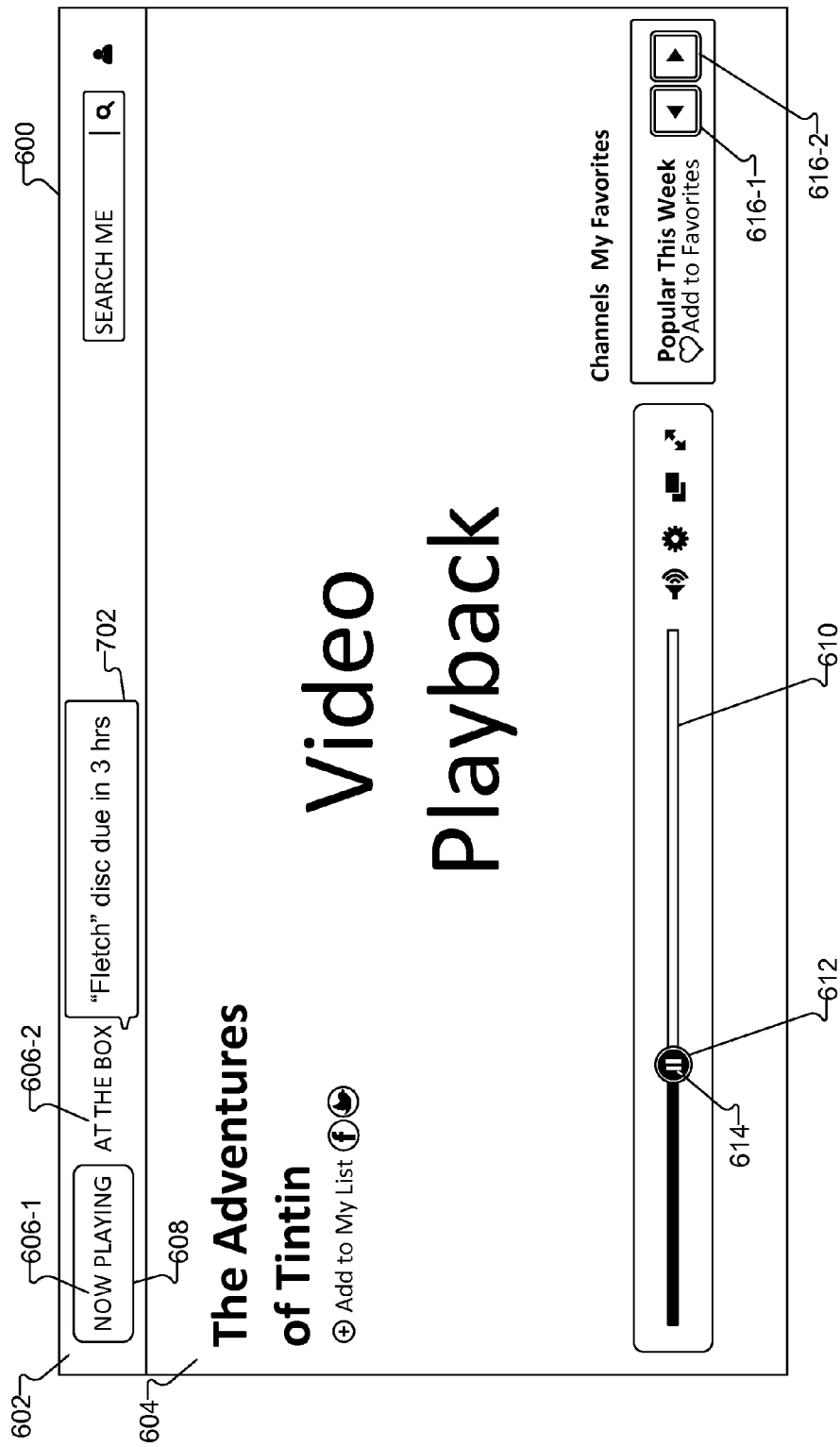

FIG. 7 illustrates GUI view 600 with an activity indicator 702 displayed therein. As shown, the activity indicator 702 may indicate an activity associated with the media-vending-kiosk functional area 204-2 of the media service 202. In the illustrated example, the activity indicator 702 indicates an amount of time remaining until a rented disc of a media program is due to be returned to a media vending kiosk. The activity indicator 702 may indicate any additional or alternative activity associated with the media-vending-kiosk functional area 204-2 of the media service 202 in other examples.

As illustrated in FIG. 7, the activity indicator 702 may allow the user to peek in on information about the media-vending-kiosk functional area 204-2 of the media service 202 while continuing to view and/or interact with the GUI view 600 associated with the functional area 204-1 for accessing and playing back on-demand media content.

In certain examples, playback of a media program within a playback area of GUI view 600 may continue uninterrupted while the activity indicator 702 is displayed. In other examples, user interface facility 104 may automatically pause the playback of the media program within the playback area of GUI view 600 while the activity indicator 702 is displayed. Whether the playback continues uninterrupted or is automatically paused while the activity indicator 702 is displayed may be determined by a setting defined in advance by a user of the media service 202.

User interface facility 104 may be configured to provide one or more user interface features in the form of one or more tools for use by a user to control playback of media content. To illustrate certain examples, GUI view 600 may include one or more user interface features for use by the user to control playback of media content within the media playback area of GUI view 600. As shown in FIG. 6, for example, GUI view 600 may include a playback progress bar 610, which may represent an overall duration of the media program being played back. As further shown, a slider button 612 may be positioned at a playback point along the playback progress bar 610 to indicate a current playback position within the media program. The slider button 612 may be slidable by the user along the playback progress bar to move the current playback position within the media program. Accordingly, the user may provide input to move the slider button 612 along the progress bar 610, such as by dragging the slider button 612 along the slider bar 610, to move playback to a different point within the media program.

The slider button 612 may be further configured to be selectable by the user to pause or resume the playback of the media program at the current playback position. For example, while the media program is being played back, the user may provide input to select the slider button 612 to pause the playback of the media program at the current playback position. If the playback of the media program is paused, the user may provide input to select the slider button 612 to resume the playback of the media program at the current playback position. In the illustrated example, the slider button 612 includes a playback play/pause control 614 integrated within the slider button 612.

With the slider button 612 configured to be both slidable along the progress bar 610 and selectable to pause or resume playback of the media program, the user may conveniently provide input, at a single control button location within GUI view 600 (e.g., at the slider button 612) to move the slider button 612 along the progress bar 610 and/or to pause playback or resume playback of the media program, without having to provide input at separate locations and/or using separate control buttons within the GUI view 600 to move the slider button 612 and to pause or resume playback of the media program as is required in conventional media playback user interfaces. Accordingly, the user may be able to provide a combination of inputs for moving the playback position and pausing or resuming playback of the media program without having to move a cursor or other input mechanism back and forth between separately located slider and play/pause buttons.

User interface facility 104 may be configured to provide one or more user interface features in the form of one or more tools for use by a user to control playback of media content by switching from playback of one media program to playback of another media program. In certain examples, the tools may include channel-change controls for use by the user to switch playback from playing back a media program associated with one programming channel to playing back a media program associated with another programming channel. Such a switch may be referred to as a "channel change" or "channel switch."

As used herein, a "programming channel" may refer to any virtual entity capable of being selected by an end user of a media service to access media content associated with the programming channel. For example, a programming channel may include a television programming channel that may be selected by an end user of a media service to access television programming content associated with (e.g., distributed by way of) the television programming channel.

In certain examples, the programming channels may be media-on-demand-based programming channels, and a channel switch may be from one media-on-demand-based programming channel to another media-on-demand-based programming channel. As used herein, a "media-on-demand-based programming channel" refers to a programming channel to which on-demand media content (e.g., a set of selected on-demand media programs) is mapped in accordance with a linear programming schedule for scheduled, linear playback in accordance with the linear programming schedule. The media-on-demand-based programming channel may be represented in a media service user interface so as to appear, from the perspective of an end user of the media service, to continually distribute the on-demand media content over time in accordance with the linear programming schedule. Accordingly, from the perspective of the end user of the media service, the distribution of the on-demand media content on the media-on-demand-based programming channel may appear to be "always on" during the linear programming schedule, and if the end user accesses the media-on-demand-based programming channel at a given time, a particular segment of a media program scheduled for distribution by way of the media-on-demand-based programming channel at that particular time is presented to the end user beginning at a playback position mapped to the given time in accordance with the linear programming schedule.

A media-on-demand-based programming channel may be generated in any way and may include any examples of a media-on-demand-based programming channel described in co-pending U.S. patent application Ser. No. 14/141,895, filed the same day as the present application and entitled SYSTEMS AND METHODS OF PROVIDING A MEDIA-ON-DEMAND-BASED PROGRAMMING CHANNEL, the content of which is hereby incorporated by reference in its entirety.

Programming channels may be organized into a channel lineup, such as an ordered list of the programming channels. In certain examples, user interface facility 104 may provide user interface features in the form of channel-change controls for use by the user to sequentially switch channels within the channel lineup (i.e., to switch from playing back a media program associated with one programming channel to playing back a media program associated with a next sequential programming channel in the channel lineup).

To illustrate, FIG. 6 shows GUI 600 to include channel change control buttons 616 (e.g., buttons 616-1 and 616-2) that may be selected by the user to change from accessing a current programming channel to accessing a next sequential programming channel in a channel lineup. For example, button 616-1 may be selected by the user to change from a currently selected programming channel to a sequentially previous programming channel in a channel lineup, and button 616-2 may be selected by the user to change from the currently selected programming channel to a sequentially next programming channel in a channel lineup.

In certain examples, buttons 616 may be configured to trigger a presentation of a preview of the media content associated with the next sequential channels to the user before actually switching away from the current programming channel to a next sequential channel in the main media playback area of GUI view 600. For example, a user may provide peek request input in association with button 616-1, such as by hovering a cursor over button 616-1. System 100 may detect the peek request input and respond by providing a preview of the media content currently playing (or scheduled to be currently playing) on the sequentially previous programming channel in the channel lineup.

Figure 8:
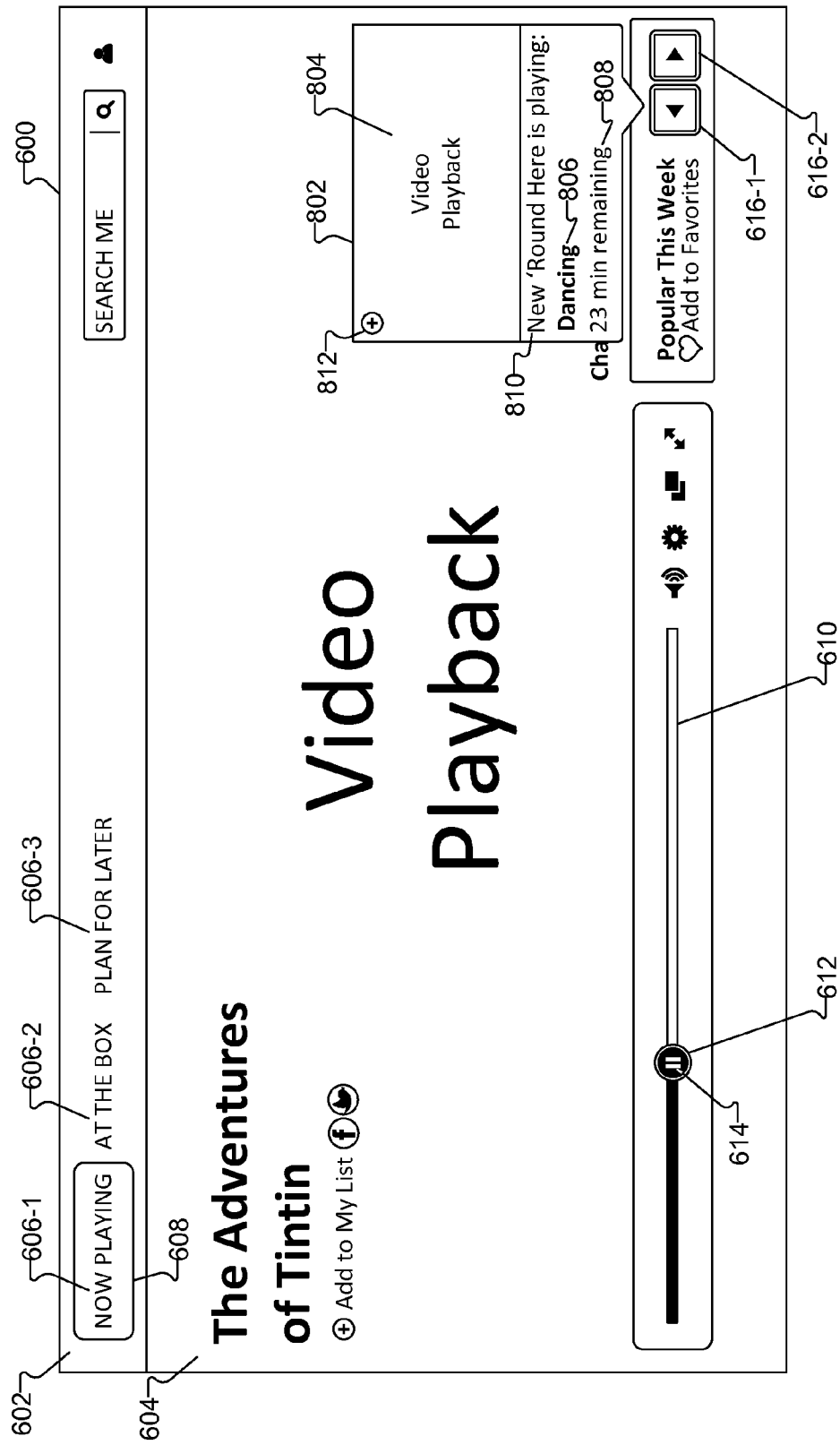

For example, user interface facility 104 may provide a pop-up preview window 802 for display in GUI view 600 as shown in FIG. 8. Preview window 802 may include content associated with the media program being played (or scheduled to be currently playing) on the sequentially previous programming channel in the channel lineup. For example, preview window 802 may include a playback of the media program in a playback area 804 and information related to the media program, such as a title 806 of the media program, an indication 808 of the remaining duration of the playback of the media program, and an indication 810 of the programming channel on which the media program is playing. Preview window 802 may include additional or alternative content associated with the media program in other examples.

As illustrated in FIG. 8, preview window 802 may be displayed together with (e.g., within) GUI view 600 without navigating away from the playback of the media program currently being played back in the media playback area of GUI view. Accordingly, the content in preview window 804 may allow a user to peek in on media content associated with another programming channel before actually switching away from the currently selected programming channel to another programming channel.

In certain examples, preview window 802 may additionally or alternatively include one or more user selectable options related to the previewed media program, such as an option 812 to add the media program to a personalized list of media programs associated with the user. Additionally or alternatively, preview window 802 may include one or more transaction options selectable by the user to access the media program (e.g., options to rent, buy, download, stream, and/or reserve the media program) in-line by way of a discrete transaction. Additionally or alternatively, preview window 802 may include one or more subscription upgrade options selectable by the user to upgrade a subscription of the user to the media service 202 to gain subscription-based permission to access the previewed media program.

In certain example, preview window 802 may provide a preview of media content to which the user does not yet have access permission. For example, the media content may be outside of (i.e., not included in) a subscription package of the user. User interface facility 802 may be configured to provide a preview of such media content in a manner that conforms to laws and/or agreements that govern the distribution of the media content. For instance, user interface facility 104 may be configured to present a thumbnail image within which content associated with a media program is displayed to the user. The thumbnail image may include a frame or other segment of the media program that is periodically updated based on a time increment schedule. For example, a still shot thumbnail image selected from the media program may be displayed for every ten seconds of video content of the media program, and the still shot thumbnail image may be updated approximately every ten seconds such that the user is able to see content of the media program to which the user does not have access, without any laws and/or agreements governing the distribution of the media program being violated. Accordingly, the user may see a preview of media content that the user is missing and may want to perform one or more actions to gain access to the content (e.g., such as by upgrading a subscription to the media service).

The playback (or scheduled playback) of a media program on a programming channel may be an activity associated with a functional area 204 of the media service 202. Accordingly, preview window 802 may be an activity indicator configured to allow a user to peek in on an activity of the media service 202. For example, while a media program playing on a programming channel is being played back in the main playback area of GUI view 600, a user may experience the playback of the media program. This may be an activity within a functional area 204 of the media service 202. While the media program is being played back, the user may provide peek request input associated with one of buttons 616. User interface facility 104 may detect the peek request input and provide preview window 802 as an activity indicator indicating another activity within the same functional area 204 of the media service 202, which other activity may be a playback (or scheduled playback) of another media program on another programming channel.

While buttons 616 have been described above in terms of switching between programming channels, buttons 616 may be configured to switch between media programs for playback in other ways. To illustrate, in certain examples, buttons 616 may be configured to be selected by a user to sequentially switch from playback of one media program included in a programming channel to playback of another media program included in the same programming channel (e.g., a currently selected media-on-demand programming channel labeled "Popular This Week" in FIG. 8). For instance, button 616-1 may be selected by the user to change from a currently selected media program in the programming channel to a temporally previous media program in the programming channel, and button 616-2 may be selected by the user to change from the currently selected media program in the programming channel to a temporally next media program in the programming channel. Accordingly, in such examples, preview window 802 may include a preview of a sequentially previous or next media program in the same programming channel as the media program currently being played back in the main playback area of GUI view 600.

In certain examples, user interface facility 104 may be configured to provide user interface content indicating a stream of activities of the media service 202, which may be referred to as an "activity stream." An activity stream may include a listing of activities of the media service 202, such as a chronologically-ordered list of recent activities of the media service 202. An activity stream may include only activities associated with a particular functional area 204 of the media service 202 or activities across multiple functional areas 204 of the media service 202.

Figure 9:
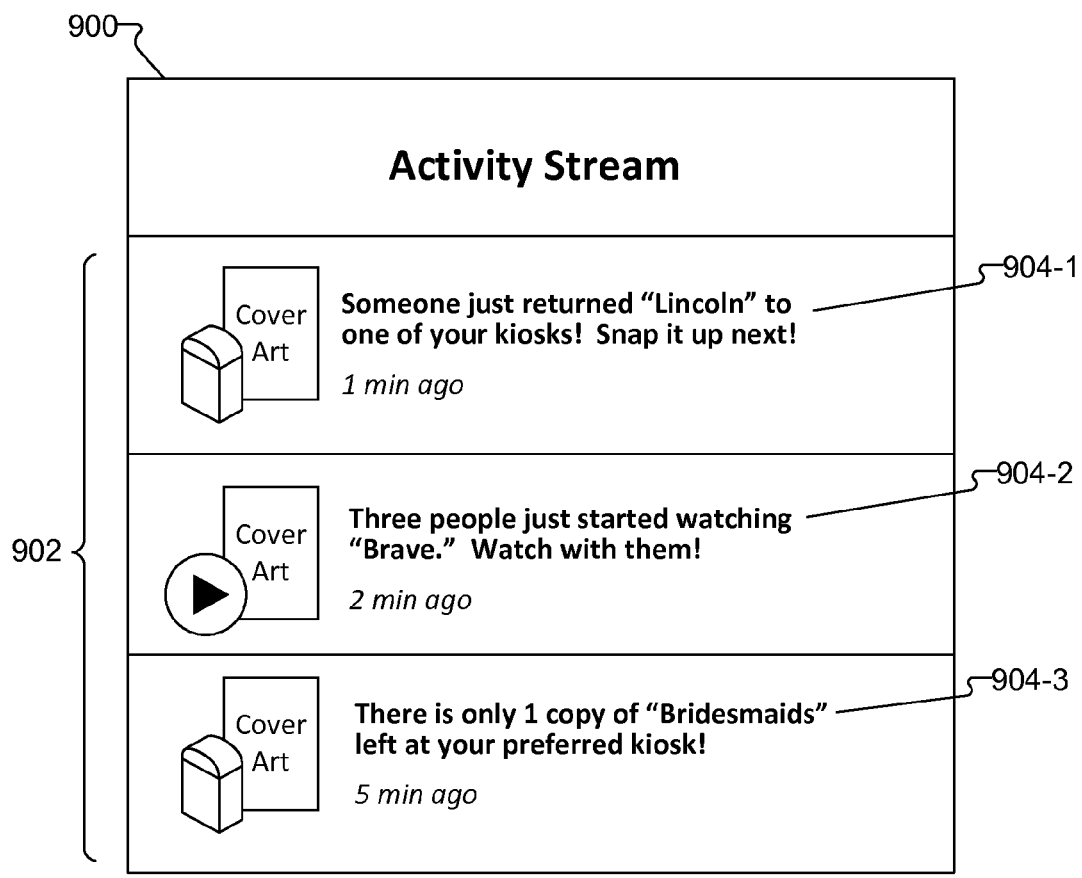

FIG. 9 illustrates a GUI view 900 that includes user interface content indicating an activity stream 902 of the media service 202. As shown, activity stream 902 may include a list of entries 904 (e.g., entries 904-1 through 904-3) indicating activities of the media service 202. In the illustrated example, entry 904-1 indicates that a user of the media service 202 recently (e.g., one minute ago) returned a physical copy of a media program to a media vending kiosk associated with a user, entry 904-2 indicates that the three other users of the media service 202 recently (e.g., two minutes ago) started consuming a particular media program, and entry 904-3 indicates that, as of five minutes ago, only one physical copy of a particular media program is in stock at a media vending kiosk associated with the user.

One or more of the entries 904 may include or indicate user selectable options associated with the activities. For example, entry 904-1 indicates an option to access the media program (e.g., "snapping it up next" by reserving or renting the media program) and entry 904-2 indicates an option to access the media program (e.g., by watching the media program concurrently with the other users who started watching the media program).

User interface facility 104 may be configured to provide user interface content indicating an activity stream of the media service 202 in any suitable user interface context. For example, such user interface content may be used to populate an activity indicator, such as activity indicator 310, activity indicator 702, or preview window 802. Accordingly, an activity indicator, such as any of the activity indicators described herein, may indicate a stream of tracked activities of a particular functional area 204 of the media service 202. With respect to activity indicator 310, for example, user interface facility 104 may populate activity indicator 310 with content indicating a stream of recent activities of the functional area 204-3 represented by navigational option 306-3. As another example, with respect to preview window 802, user interface facility 104 may populate preview window 802 with content indicating a stream of activities such as playbacks (or scheduled playbacks) of media programs on the currently selected programming channel or on a next sequential programming channel in a channel lineup.

In certain examples, user interface facility 104 may be configured to select and provide user interface content based on which functional area 204 of the media service 202 a user interface is accessed by a user.

For example, a user may provide input to navigate to an information user interface view for a media program (e.g., a title details screen view for a movie), which information view may include detailed information and/or user selectable options associated with the media program. User interface facility 104 may be configured to select the information and/or options to be included in the information view for the media program based on the context from which the user accesses the information view. To illustrate, if a user provides input to access an information view for a media program from within a "now playing" functional area 204 of the media service 202, user interface facility 104 may detect this context and select a particular set of options based on the context. For example, user interface facility 104 may select options that are related to a current playback of the media program, such as options for commenting about the media program, sharing the media program, rating the media program, marking a favorite scene in the media program, etc., and populate the information view for the media program with the selected options.

If the user instead accesses the information view for the media program from a different context, user interface facility 104 may select a different set of options to present within the information view for the media program. For example, if a user accesses the information view for the media program from within a "plan for later" functional area 204 of the media service 202, a different set of options related to the media program may be selected and presented within the information view. For example, user interface facility 104 may select options related to planning for access and consumption of the media program (e.g., transactional options for use by the user to purchase, rent, or otherwise access the media program), options for adding the media program to a personalized list of media content associated with the user, options for tagging the media program for future reference, options for discovering other media content related to the media program, options for previewing the media program or related media programs, etc. for inclusion in the information view for the media program Accordingly, in this or a similar manner, an information view for a media program, or other media service user interface view, may change based on the context from which the view is accessed by a user.

In certain examples, user interface facility 104 may be configured to filter media content and present a media service user interface based on the select, filtered media content. User interface facility 104 may be configured to filter media content based on any suitable filter conditions, including, for example, a mood of a user of the media service 202, a media content ratings condition, and/or any other conditions. User interface facility 104 may apply a filter to any set of media content, such as to a playlist of media content, programming channels (e.g., media-on-demand-based programming channels), media content included in a media browse user interface view, and/or any other set of media content.

In certain examples, user interface facility 104 may be configured to lock viewing capabilities and/or access permissions to a filtered set of media content. For example, user interface facility 104 may filter programming channels to include only programming channels associated with children's shows or only programming channels that do not contain any horror genre media programs. User interface facility 104 may provide a media service user interface based on the filtered programming channels (e.g., a view showing only programming channels included in the filtered set of programming channels). A user may provide input to request that the media service user interface, or a particular view of the media service user interface, be locked to the filtered set of programming channels. User interface facility 104 may receive the request and lock the media service user interface, or specific view of the media service user interface, such that only the filtered set of programming channels may be accessed. Such a lock feature may function as a form of parental controls. This may allow a parent to easily and conveniently put the media service 202 into child-friendly mode, for example.

In certain examples, user interface facility 104 may be configured to select and present content of a user interface in accordance with a selected global content setting of the media service 202. When active, the selected global content setting may affect what media programs and/or programming channels are selected and presented in a user interface by user interface facility 104. Additionally or alternatively, the selected global content setting may affect what other user interface content is selected and presented in a user interface by user interface facility 104. For example, user interface facility 104 may select user interface content to promote an overall tone and/or personality of a user interface and/or to tailor the user interface to a target audience based on the global content setting. The selected content setting may be activated to be "always on" and to apply to all views of a media service user interface. Accordingly, the selected content setting may globally affect user interface views presented by user interface facility 104.

User interface facility 104 may provide a set of multiple content settings from which a content setting may be selected and made active. As an example, a set of content settings may include different Motion Picture Association of America ("MPAA") ratings as settings, such as a "PG" setting, a "PG-13" setting, and an "R" setting.

When the "PG" setting is active, user interface facility 104 may limit content of a user interface to "PG" rated and milder content (e.g., "G" rated content, "PG" rated content, unrated content in family and/or kids genres, light and cheery content, etc.). For example, messages (e.g., descriptions, instructions, errors, etc.) presented in user interfaces may be light, cheery, whimsical, and/or kid-friendly when the "PG" setting is active.

When the "PG-13" setting is active, user interface facility 104 may limit content of a user interface to "PG-13" rated and milder content (e.g., "G" rated content, "PG" rated content, "PG-13" rated content, TV-14 rated content, edgier content than what is included in a "PG" content setting, etc.). For example, messages (e.g., descriptions, instructions, errors, etc.) presented in user interfaces may be somewhat witty and/or edgy when the "PG-13" setting is active.

When the "R" setting is active, user interface facility 104 may remove content limits of a user interface and/or include any content up to "R" rated content. Messages (e.g., descriptions, instructions, errors, etc.) presented in user interfaces may be unrestricted and/or targeted to an audience not easily offended when the "R" setting is active. Certain messages that are normally active during operation in a "PG" or "PG-13" content setting may be turned off during operation in the "R" content setting. For example, messages prompting a user to perform an operation, such as providing a password or checking a checkbox to show "R" rated content, may be disabled when the "R" content setting is active.

In certain examples, user interface facility 104 may activate one of the content settings by default. For example, the "PG" or "PG-13" may be defined as a default selection of the content setting. User interface facility 104 may provide one or more tools by way of which a user may change the selected content setting.

In certain examples, user interface facility 104 may provide additional content in a user interface that is a step up from the content associated with a selected content filter. For example, if the "PG" content setting is active, in addition to providing "PG" rated content in a user interface, user interface facility 104 may provide user interface content representative of "PG-13" rated content to inform the user as to what content is being hidden from the filtered user interface. User interface facility 104 may be configured to include user interface content only for mild "PG-13" rated content. This may allow the user to see more expansive information than what would normally be presented in a user interface. Restrictions on the "PG-13" rated content may remain in place. For example, a user selection of user interface content representing "PG-13" rated content may cause a message to be displayed that prompts the user to perform an additional operation, such as provide a password and/or change the active content setting, in order to unblock the "PG-13" rated content.

Such global-content-setting-based selection of user interface content, tone, and/or personality may provide a user with different and/or more expansive content discovery user interface options than are conventionally available. A user may select a desired content setting to automatically and globally affect what user interface content, tone, and/or personality is presented to the user.

In certain examples, user interface facility 104 may be configured to automatically change between different content settings based on a defined schedule, which schedule may be custom defined by a user of the media service 202. For example, the user may provide input to define a content setting schedule in which the "PG" content setting is active before 9:00 pm and the "R" content setting is active after 9:00 pm (e.g., after children are in bed).

System 100 may be embodied in any suitable implementation as may suit a particular application of principles described herein. To illustrate, examples of such implementations will now be described.

Figure 10:
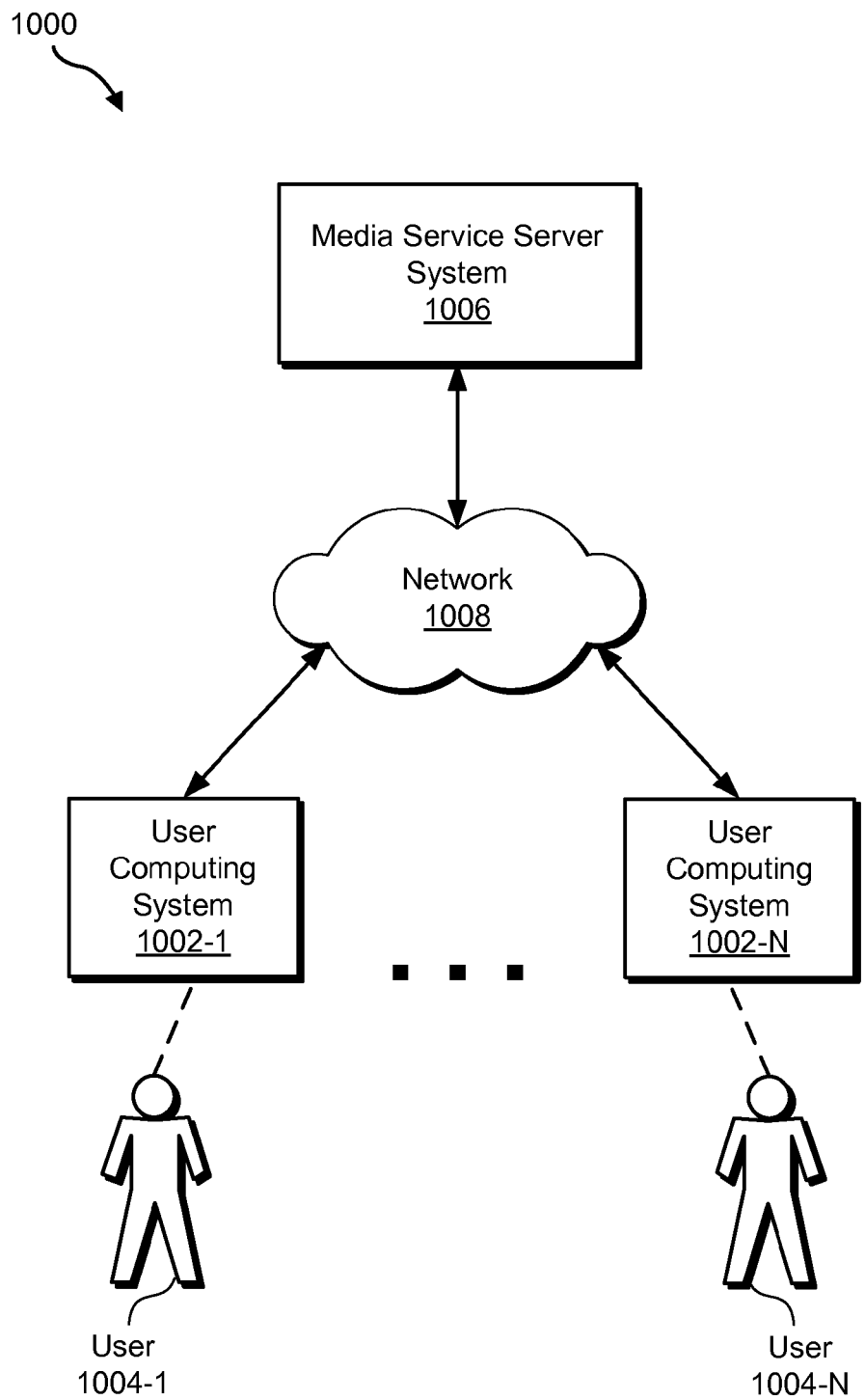
FIG. 10 illustrates an exemplary implementation of the system of FIG. 1 according to principles described herein.

FIG. 10 shows an exemplary implementation 1000 of system 100. As shown, implementation 1000 may include user computing systems 1002 (e.g., user computing systems 1002-1 through 1002-N) respectively associated with users 1004 (e.g., users 1004-1 through 1004-N), which may be end users of a media service provided by system 100. User computing systems 1002 may be in communication with a media service server system 1006 ("server system 1006"), which may include one or more computing devices (e.g., server devices remotely located from user computing systems 1002). In implementation 1000, one or more of facilities 102-106 of system 100 may be implemented entirely by a user computing system 1002, entirely by server system 1006, or distributed across a user computing system 1002 and server system 1006 in any manner configured to facilitate a user 1004 accessing the media service and/or media programs provided by system 100.

User computing systems 1002 and server system 1006 may communicate using any communication platforms and technologies suitable for transporting data (e.g., media program data) and/or communication signals, including known communication technologies, devices, media, and protocols supportive of remote communications, examples of which include, but are not limited to, data transmission media, communications devices, Transmission Control Protocol ("TCP"), Internet Protocol ("IP"), Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, wireless communication technologies, Internet communication technologies, media streaming technologies, media download technologies, and other suitable communications technologies.

In certain embodiments, user computing systems 1002 and server system 1006 may communicate via a network 1008. Network 1008 may include one or more networks, such as one or more wireless networks (Wi-Fi networks), wireless communication networks, mobile telephone networks (e.g., cellular telephone networks), closed media networks, open media networks, wide area networks (e.g., the Internet), local area networks, and any other networks capable of carrying data (e.g., streaming and/or downloading media programs) and/or communications signals between user computing systems 1002 and server system 1006. Communications between user computing systems 1002 and server system 1006 may be transported using any one of the above-listed networks, or any combination or sub-combination of the above-listed networks. Alternatively, user computing systems 1002 and server system 1006 may communicate in another way such as by direct connections between user computing systems 1002 and server system 1006.

Server system 1006 may be configured to distribute media programs to user computing systems 1002 for access and use by user computing systems 1002 to present media programs for consumption by users 1004. Server system 1006 may distribute media programs to user computing systems 1002 as part of the media service provided by system 100 and using any suitable media streaming and/or downloading technologies (e.g., Internet media streaming and/or downloading technologies). In certain examples, the media service may comprise an online media streaming service such as an Internet streaming video service, and server system 1006 may be configured to stream media programs on-demand to user computing systems 1002 by way of network 1008.

In certain examples, server system 1006 may be configured to provide one or more user interfaces for access by user computing systems 1002. The user interfaces may be configured for use by users 1004 to interact with the media service, including discovering and/or accessing media programs distributed by way of the media service. The user interfaces may include any of the exemplary user interface views described herein.

A user computing system 1002 may be configured for use by a user 1004 associated with (e.g., operating) the user computing system 1002 to access the media service provided by system 100. For example, the user 1004 may utilize the user computing system 1002 to access one or more user interfaces provided by system 100 as part of the media service, and to present the user interfaces for use by the user 1004 to discover, access, and/or consume media programs distributed by server system 1006 as part of the media service.

A user computing system 1002 may include one or more user computing devices associated with a user 1004. Examples of such devices include, without limitation, a media player computing device, a display device, a set-top box, a digital video recording ("DVR") device, a computer, a tablet computer, a smart phone device, and any other device capable of accessing the media service and/or media programs provided by system 100.

In certain examples, a user computing system 1002 may include a first user computing device (e.g., a primary display device) configured to play back a media program and a second user computing device (e.g., a secondary or companion display device) configured to display a GUI that may compliment or be used together with the playback of the media program by the first user computing device. For instance, a television may provide a primary display screen on which a video program may be displayed, and a tablet computer may provide a secondary display screen on which a GUI (e.g., a GUI related to the video program, the playback of the video program, and/or the media service) may be displayed. Such an example is illustrative only. Other examples of a user computing system 1002 may include any combination of user computing devices or a single user computing device configured to perform any of the user computing system and/or device operations described herein.

Figure 11:
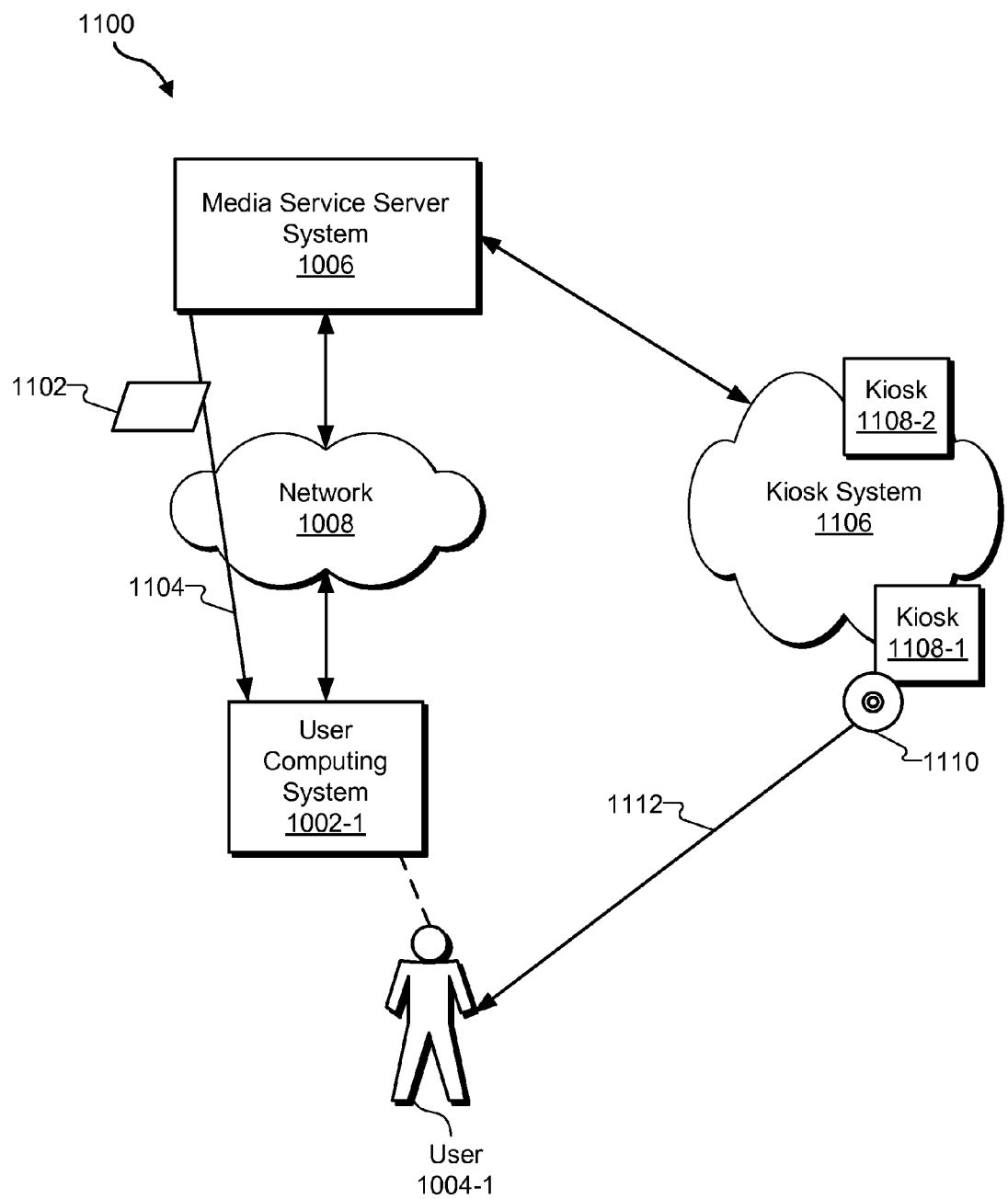
FIG. 11 illustrates another exemplary implementation of the system of FIG. 1 according to principles described herein.

FIG. 11 illustrates an exemplary implementation 1100 of system 100. Implementation 1100 is similar to implementation 1000 and additionally utilizes an exemplary media distribution configuration to distribute media programs to end users of a media distribution service. The media distribution configuration may support distribution of media programs, through the media distribution service, by way of multiple different media distribution channels, such as a digital media distribution channel and a physical media distribution channel. As shown, server system 1106 may distribute media programs such as digital data 1102 representative of a media program to user computing system 1002-1 by way of a digital media distribution channel 1104. This distribution may utilize any suitable media streaming and/or downloading technologies (e.g., Internet media streaming and/or downloading technologies) to support delivery of digital data representative of media programs to user computing system 1002 by way of network 1008.

As further shown in FIG. 11, server system 1006 may be in communication with a media vending kiosk system 1106, which may include one or more geographically distributed vending kiosks 1108 (e.g., vending kiosks 1108-1 and 1108-2) configured to vend physical copies of media programs, such as a physical copy 1110 of a media program, to user 1004-1 by way of a physical media distribution channel 1112. For example, user 1004-1 may visit a location of media vending kiosk 1108-1 and obtain the physical copy 1110 of the media program from the media vending kiosk 1108-1. In certain examples, one or more of the vending kiosks 1108 may include automated media vending machines.

In certain examples, implementation 1100 may be configured to provide users of the media distribution service with access to media programs by way of a plurality of different media distribution models ("distribution models"). Each distribution model may define a particular way that an end user of the media distribution service may gain access to media programs through the media distribution service. Thus, a user of the media distribution service may be able to gain access to media programs by way of multiple different distribution models.

In certain examples, the distribution models may include multiple distribution channel-based models such as a digital media distribution model that corresponds to a digital media distribution channel and a physical media distribution model that corresponds to a physical media distribution channel. For example, a digital media programs distribution model may include and/or utilize the digital media distribution channel 1104 of FIG. 11, and a physical media distribution model may include or utilize the physical media distribution channel 1112 of FIG. 11.

Additionally or alternatively, the distribution models may include different compensation-based models for gaining access to media programs. For example, the distribution models may include one or more subscription-based distribution models and one or more transactional-based distribution models. A subscription-based distribution model may be defined by a service provider to provide a user with access to certain media programs based on a subscription of the user to the media distribution service (e.g., a monthly-fee subscription, a temporary free-trial subscription, or another defined subscription). A transactional-based distribution model may be defined by a service provider to provide a user with access to certain media programs based on discrete transactions dedicated to accessing specific media programs. For example, access to a media program may be provided in exchange for a fee dedicated to a rental or a purchase of the media program. The conditions of the access may be defined to be different for a rental and a purchase of the media program, in which case each of the rental and the purchase may be a different transaction-based distribution model (e.g., a media rental distribution model and a media purchase distribution model).

In certain examples, the distribution models may include different models that are combinations of channel-based distribution models and compensation-based distribution models. For example, the different models may include one or more of a subscription-based and digital channel-based distribution model, a transactional-based and digital channel-based distribution model, a subscription-based and physical channel-based distribution model, and a transactional-based and physical channel-based distribution model.

Figure 12:
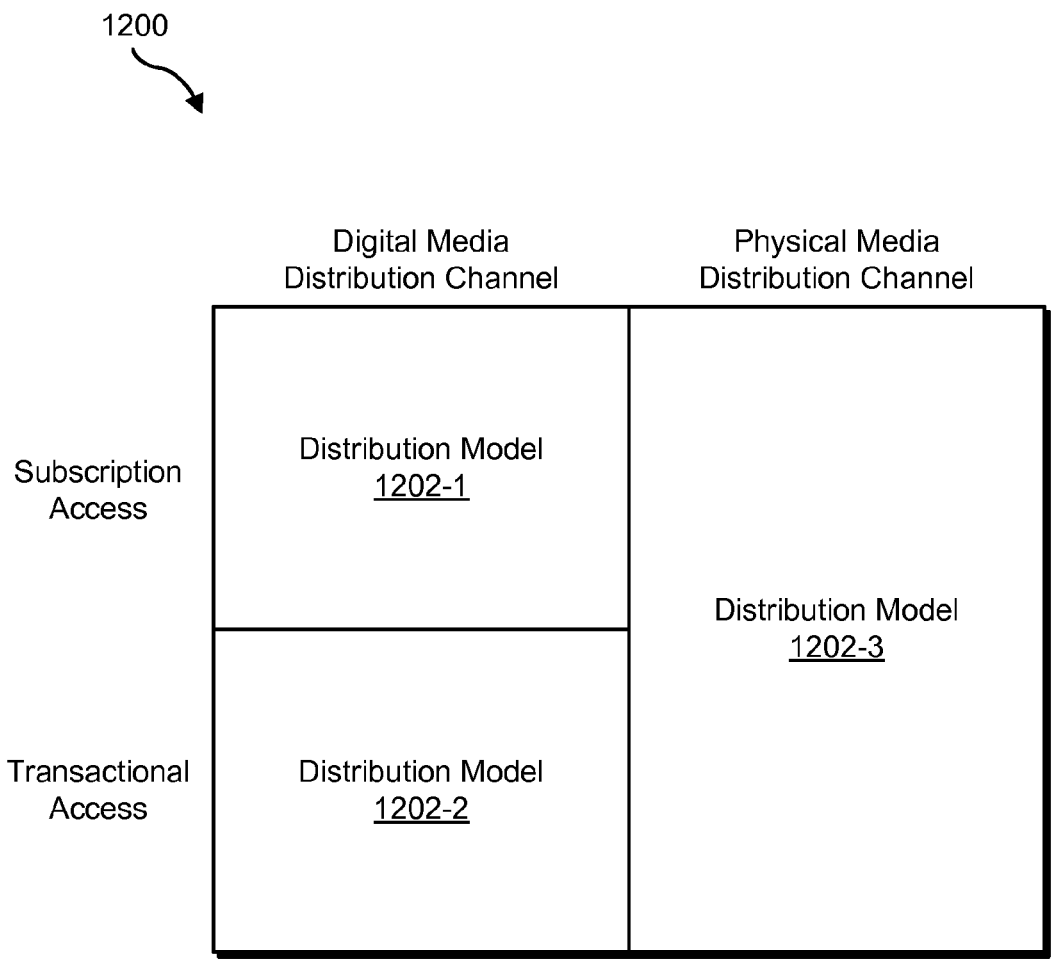
FIG. 12 illustrates a table representing an exemplary set of different media distribution models by way of which access to media programs may be provided by way of a media distribution service according to principles described herein.

Implementation 1100 may be configured to provide users of the media distribution service with access to media programs by way of any of the different distribution models described herein, or by way of any combination or sub-combination thereof. As an example, FIG. 12 illustrates a table 1200 representing a set of different distribution models by way of which access to media programs may be provided through the media distribution service in certain examples. As shown, the set of distribution models includes a first distribution model 1202-1 associated with subscription-based access to media programs by way of a digital media distribution channel, a second distribution model 1202-2 associated with transactional-based access to media programs by way of the digital media distribution channel, and a third distribution model 1202-3 associated with either or both subscription-based or transactional-based access to media programs by way of a physical media distribution channel. In certain examples, these distribution models 1202 may be referred to as a "subscription" digital distribution model 1202-1, an "on-demand" or "rent/buy" digital distribution model 1202-2, and a "physical" or "kiosk" distribution model 1202-3.

Media programs distributed by implementation 1100 as part of the media distribution service may be assigned (e.g., by a provider of the media distribution service) to one or more of the distribution models provided by implementation 1100. For example, certain media programs may be made available by way of all of the distribution models and certain media programs may be made available by way of only a subset of the distribution models (e.g., by way of only a subscription-based and digital channel-based distribution model, only a transaction-based and digital channel-based distribution model, only a physical channel-based distribution model, only a transaction-based distribution model, etc.).

In certain examples, assignments of media programs to distribution models may change over time. For example, for a first period of time, a media program may be distributed by way of distribution model 1202-3 only. At the end of that period of time, the media program may leave distribution model 1202-3, meaning that the media program is no longer accessible by way of distribution model 1202-3. For a second period of time, however, the same media program may be distributed by way of distribution model 1202-2 only. For example, when the media program leaves distribution model 1202-3, the media program may be added to distribution model 1202-2. At the end of the second period of time, the same media program may leave distribution model 1202-2 and be assigned to distribution model 1202-1. This example is illustrative only, a media program may be made accessible by way of different distribution models or specific combinations of distribution models for specific periods of time, and may be added to or removed from any distribution model in any suitable way.

Implementation 1100 may maintain and/or otherwise have access to data representing relationships between media programs and distribution models by way of which the media programs are distributed. Such data may indicate to which distribution models the media programs are assigned and periods of time for the assignments (e.g., periods of time during which media programs are assigned to the distribution models). This data may be maintained in any suitable way, including in distinct source catalogues respectively associated with the distribution models, in an integrated catalogue associated with all of the distribution models (e.g., an integrated catalogue that includes an aggregation of non-redundant data included in the source catalogues), or a combination of such source catalogues and an integrated catalogue.

In certain examples, functional areas 204 of the media service 202 illustrated in FIG. 2 may correspond to one or more media distribution channels and/or models, such as media distribution channels 1104 and/or 1112 and/or media distribution models 1202-1, 1202-2, and/or 1202-3. Accordingly, one or more of the operations described herein as being associated with a functional area 204 of the media service 202 may also be associated with one or more of the media distribution channels and/or models described herein.

Figure 13:
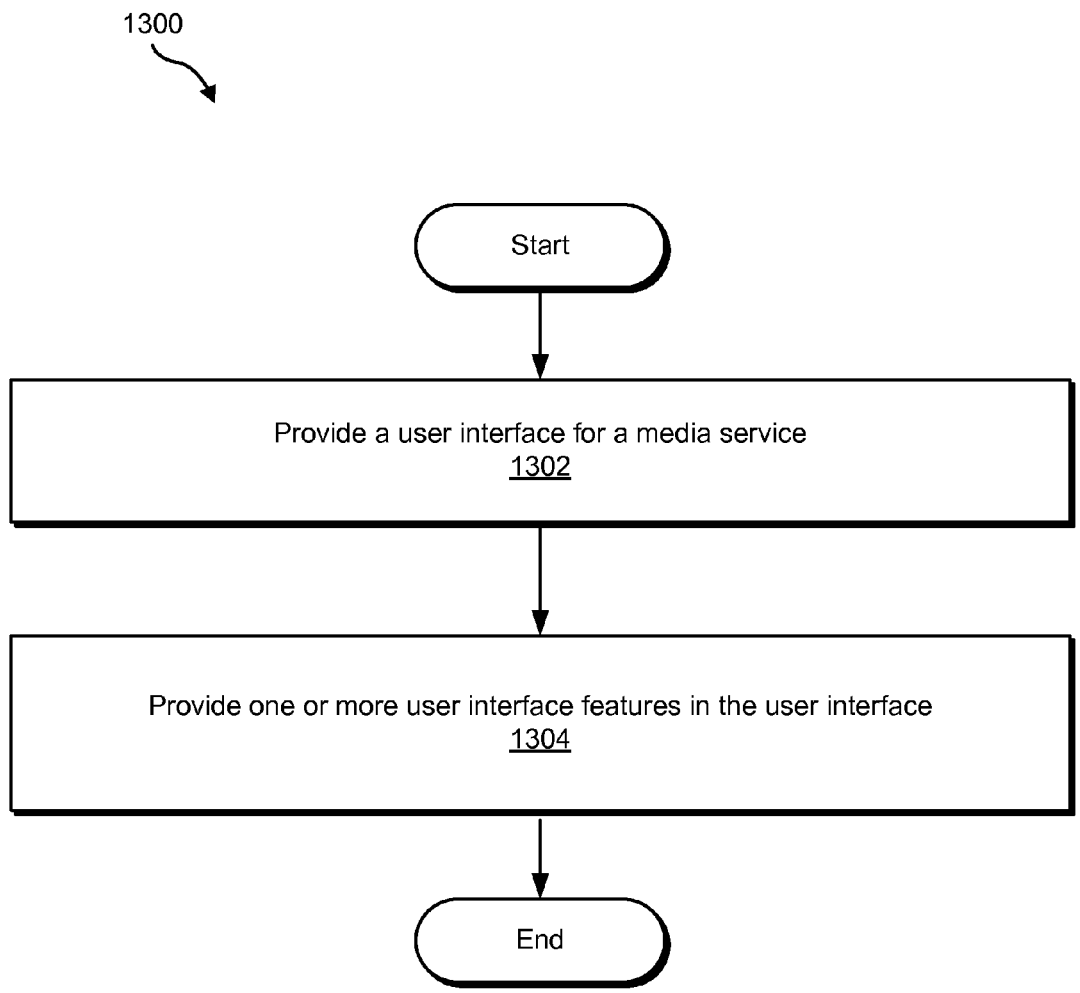
FIGS. 13-14 illustrate exemplary methods of providing a media-on-demand-based programming channel according to principles described herein.
Figure 14:
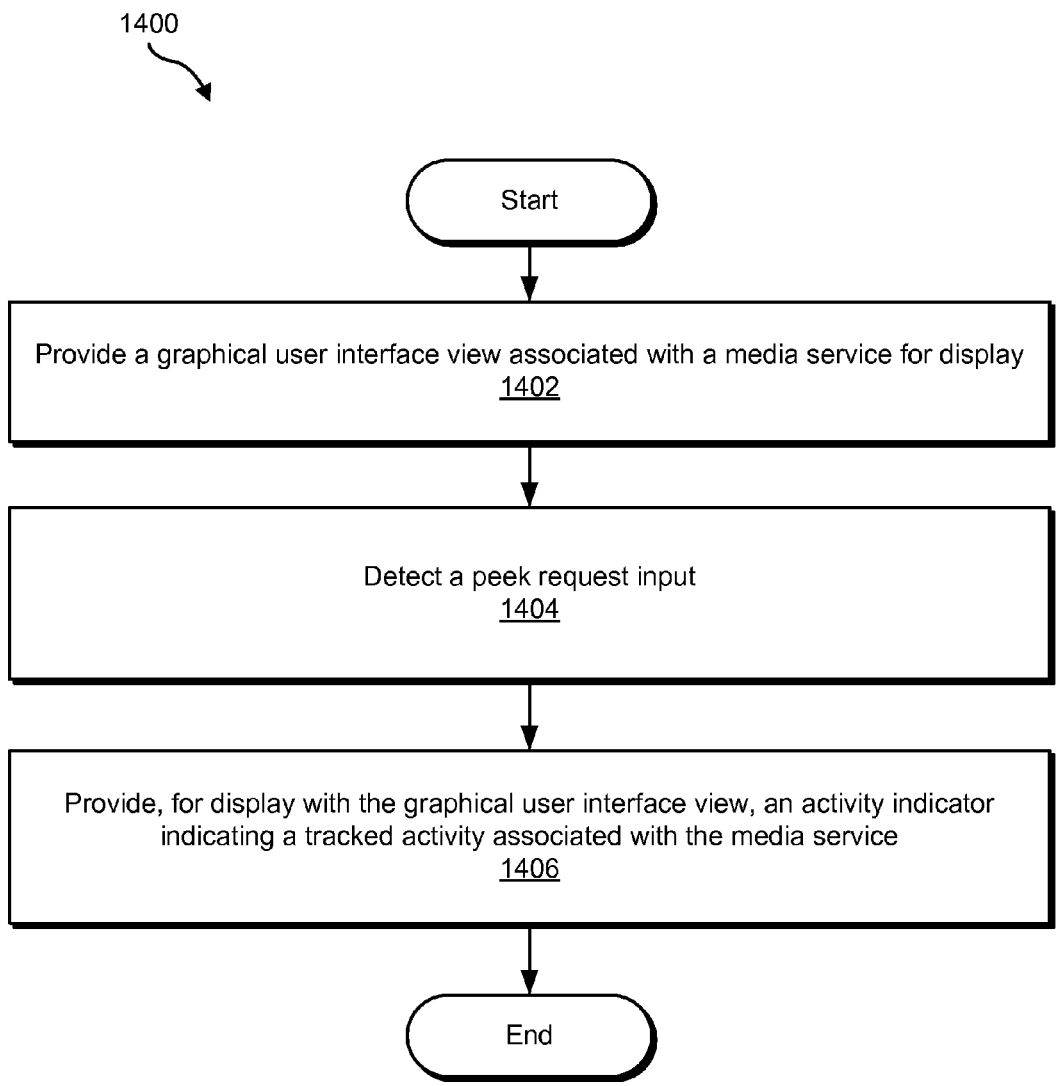

FIGS. 13-14 illustrate exemplary methods 1300 and 1400 of providing user interface features for a media service according to principles described herein. While FIGS. 13-14 illustrate exemplary steps according to certain embodiments, other embodiments may omit, add to, reorder, combine, and/or modify any of the steps shown in FIGS. 13-14. In certain embodiments, one or more of the steps shown in FIGS. 13-14 may be performed by system 100 and/or one or more components or implementations of system 100.

Turning to the method 1300 illustrated in FIG. 13, in step 1302, a system (e.g., system 100) provides a user interface for a media service. Step 1302 may be performed in any of the ways described herein, including by system 100 providing a GUI view associated with the media service for display, such as described herein.

In step 1304, the system provides one or more user interface features in the user interface. Step 1304 may be performed in any of the ways described herein, including by system 100 providing one or more of the exemplary user interface features described herein in a GUI view associated with the media service. For example, system 100 may provide an activity indicator in the GUI view, such as described herein.

Turning to the method 1400 illustrated in FIG. 14, in step 1402, a system (e.g., system 100) provides a GUI view associated with a media service for display, such as described herein.

In step 1404, the system detects a peek request input, such as described herein.

In step 1406, the system provides, for display with the GUI view, an activity indicator indicating a tracked activity associated with the media service, such as described herein. Step 1406 may be performed in response to the detected peek request input and in any of the ways described herein.

To illustrate an exemplary implementation of method 1400, the system may provide a GUI view associated with a first functional area of a media service for display when the first functional area of a media service have an active status, such as described herein. While the GUI view is displayed, the system may detect a peek request input, which may be provided by a user through the GUI view. In response to the peek request input, the system may provide, for display together with the GUI view, an activity indicator indicating a tracked activity associated with a second functional area of the media service, such as described herein. The activity indicator may include any of the exemplary activity indicators described herein or any other activity indicator that may provide a peek in on the tracked activity of the second functional area of the media service.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a disk, hard disk, magnetic tape, any other magnetic medium, a Compact Disc Read-Only Memory ("CD-ROM"), a Digital Versatile Disc ("DVD"), any other optical medium, a Random-Access Memory ("RAM"), a Programmable ROM ("PROM"), an Erasable PROM ("EPROM"), a Flash Electrically EPROM ("FLASH-EEPROM"), any other memory chip or cartridge, or any other tangible medium from which a computer can read.

Figure 15:
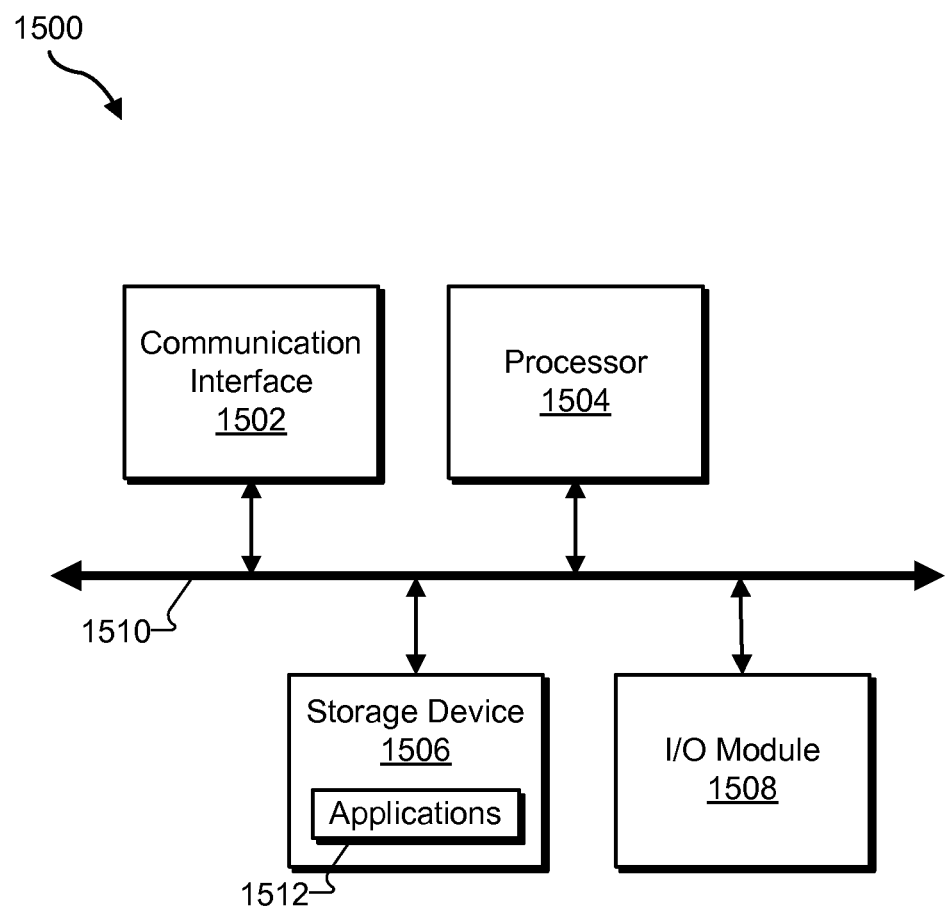
FIG. 15 illustrates an exemplary computing device according to principles described herein.

FIG. 15 illustrates an exemplary computing device 1500 that may be configured to perform one or more of the processes described herein. As shown in FIG. 15, computing device 1500 may include a communication interface 1502, a processor 1504, a storage device 1506, and an input/output ("I/O") module 1508 communicatively connected via a communication infrastructure 1510. While an exemplary computing device 1500 is shown in FIG. 15, the components illustrated in FIG. 15 are not intended to be limiting. Additional, fewer, or alternative components may be used in other embodiments. Components of computing device 1500 shown in FIG. 15 will now be described in additional detail.

Communication interface 1502 may be configured to communicate with one or more computing devices. Examples of communication interface 1502 include, without limitation, a wired network interface (such as a network interface card), a wireless network interface (such as a wireless network interface card), a modem, an audio/video connection, and any other suitable interface.

Processor 1504 generally represents any type or form of processing unit capable of processing data or interpreting, executing, and/or directing execution of one or more of the instructions, processes, and/or operations described herein. Processor 1504 may execute and/or direct execution of operations as directed by one or more applications 1512 or other computer-executable instructions such as may be stored in storage device 1506 or another computer-readable medium.

Storage device 1506 may include one or more data storage media, devices, or configurations and may employ any type, form, and combination of data storage media and/or device. For example, storage device 1506 may include, but is not limited to, a hard drive, network drive, flash drive, magnetic disc, optical disc, RAM, DRAM, other non-volatile and/or volatile data storage units, or a combination or sub-combination thereof. Electronic data, including data described herein, may be temporarily and/or permanently stored in storage device 1506. For example, data representative of one or more applications 1512 configured to direct processor 1504 to perform any of the operations described herein may be stored within storage device 1506. In some examples, data may be arranged in one or more databases residing within storage device 1506.

I/O module 1508 may be configured to receive user input and provide user output and may include any hardware, firmware, software, or combination thereof supportive of input and output capabilities. For example, I/O module 1508 may include hardware and/or software for capturing user input, including, but not limited to, a keyboard or keypad, a touch screen component (e.g., touch screen display), a receiver (e.g., an RF or infrared receiver), and/or one or more input buttons.

I/O module 1508 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 1508 is configured to provide graphical data to a display for presentation to a user. The graphical data may be representative of one or more GUI views and/or any other graphical content as may serve a particular implementation.

In some examples, any of the facilities described herein may be implemented by or within one or more components of computing device 1500. For example, one or more applications 1512 residing within storage device 1506 may be configured to direct processor 1504 to perform one or more processes or functions associated with feature facility 102 and/or user interface facility 104. Likewise, storage facility 106 may be implemented by or within storage device 1506. Such an implementation may be referred to as a computer-implemented system, such as a computer-implemented media service system 100.

To the extent the aforementioned embodiments collect, store, and/or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

To the extent the aforementioned embodiments may modify media programs and/or provide alternative ways for users to access and/or consume media programs, it should be understood that such operations shall be used in accordance with all applicable laws and/or agreements concerning protection of media programs and the rights of owners and/or distributors of media programs. One or more of the operations described herein may be performed or provided as a feature subject to the consent and/or agreement of one or more entities, such as owners and/or distributors of media programs.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
providing, by a computer-implemented media service system, a plurality of functional areas of a media service, the plurality of functional areas comprising a first functional area including a first set of features accessible by way of a first user interface set and a second functional area including a second set of features accessible by way of a second user interface set;
providing, by the computer-implemented media service system when the first functional area has an active status, a graphical user interface view included in the first user interface set of the first functional area of the media service for display on a display screen associated with a user computing device, the graphical user interface view including a menu of navigational options that includes
a first navigational option representing the first functional area of the media service, and
a second navigational option representing the second functional area of the media service and configured, upon selection of the second navigational option by a first predefined user input associated with the second navigational option, to activate the second functional area to the active status;
detecting, by the computer-implemented media service system while the graphical user interface view included in the first user interface set of the first functional area of the media service is displayed, a second predefined user input associated with the second navigational option and different from the first predefined user input and provided by way of the user computing device; and
providing, by the computer-implemented media service system for display in the graphical user interface view included in the first user interface set of the first functional area of the media service and in response to the detecting of the second predefined user input associated with the second navigational option, an activity indicator indicating a tracked activity associated with the second functional area of the media service,
wherein
the activity indicator is provided for display in the graphical user interface view included in the first user interface set of the first functional area of the media service without changing the graphical user interface view included in the first user interface set of the first functional area of the media service, and
the activity indicator includes a selectable option associated with the tracked activity and configured to allow a user, upon selection of the selectable option, to interact with a feature included in the second set of features associated with the second functional area without activating the second functional area to the active status.

2. The method of claim 1, wherein the tracked activity comprises an interaction of a user with the second functional area of the media service.

3. The method of claim 2, wherein the interaction of the user with the second functional area of the media service comprises at least one of:
an interaction of the user with a media program by way of the second functional area of the media service; and
an interaction of the user with a graphical user interface view included in the second user interface set of the second functional area of the media service.

4. The method of claim 1, wherein the tracked activity indicator comprises a reminder associated with the activity.

5. The method of claim 1, wherein the tracked activity indicator indicates a last state of the second functional area of the media service, the last state associated with the activity.

6. The method of claim 1, wherein the activity indicator comprises an image of a graphical user interface view included in the second user interface set of the second functional area and representative of the last state of the second functional area.

7. The method of claim 1, wherein the tracked activity comprises a new availability of a media program in the second functional area of the media service.

8. The method of claim 1, further comprising providing, by the computer-implemented media service system, a notification associated with the second navigational option, the notification indicating an availability of the activity indicator associated with the second functional area of the media service.

9. The method of claim 1, wherein the activity indicator indicates a stream of tracked activities associated with the second functional area of the media service, the tracked activity included in the stream of tracked activities.

10. The method of claim 1, wherein:
the graphical user interface view included in the first user interface set of the first functional area of the media service comprises a media playback area in which a media program included in a media-on-demand programming channel is played back while the graphical user interface view is displayed;
the graphical user interface view further comprises a channel-switch option selectable by a user to switch from the playback of the media program to one of
a playback of another media program included in the media-on-demand programming channel, and
a playback of another media program included in another media-on-demand programming channel.

11. The method of claim 10, further comprising:
detecting, by the computer-implemented media service system, a predefined user input associated with the channel-switch option; and
providing, by the computer-implemented media service system for display in the graphical user interface view included in the first user interface set of the first functional area of the media service and in response to the detecting of the predefined user input associated with the channel-switch option, a preview window including a preview of one of
the another media program included in the media-on-demand programming channel, and the another media program included in the another media-on-demand programming channel.

12. The method of claim 11, wherein the preview window comprises a user selectable option to add the previewed media program to a personalized list of the user.

13. The method of claim 11, wherein the preview window comprises a user selectable option to access the previewed media program by one of
upgrading a subscription of the user to gain subscription-based permission to access the previewed media program, and
paying for transactional access to the previewed media program.

14. The method of claim 1, wherein:
the graphical user interface view included in the first user interface set of the first functional area of the media service comprises a media playback area in which a media program included in a media-on-demand programming channel is played back while the graphical user interface view is displayed;
the graphical user interface view included in the first user interface set of the first functional area of the media service further comprises a playback progress bar and a slider button positioned on the playback progress bar, wherein the slider button is
slidable by a user along the playback progress bar to change a playback position within the media program, and
selectable by the user to pause or resume the playback of the media program.

15. The method of claim 1, wherein:
the first functional area of the media service corresponds to one of a media-on-demand component of the media service and a physical-media-distribution component of the media service; and
the second functional area of the media service corresponds to the other one of the media-on-demand component of the media service and the physical-media-distribution component of the media service.

16. The method of claim 15, wherein the physical-media-distribution component of the media service comprises a physical copy rental component of the media service.

17. The method of claim 1, embodied as computer-executable instructions on at least one non-transitory computer-readable medium.

18. A method comprising:
providing, by a computer-implemented media service system, a plurality of functional areas of a media service, the plurality of functional areas comprising a first functional area including a first set of features accessible by way of a first user interface set and a second functional area including a second set of features accessible by way of a second user interface set;
providing, by the computer-implemented media service system when the first functional area has an active status, a graphical user interface view included in the first user interface set of the first functional area of the media service for display on a display screen associated with a user computing device, the graphical user interface view including a menu of navigational options that includes
a first navigational option representing the first functional area of the media service, and
a second navigational option representing the second functional area of the media service and configured, upon selection of the second navigational option by a first predefined user input associated with the second navigational option, to activate the second functional area to the active status;
providing, by the computer-implemented media service system, a notification associated with the second navigational option in the graphical user interface view, the notification indicating an availability of an activity indicator associated with the second functional area of the media service;
detecting, by the computer-implemented media service system while the notification is displayed in the graphical user interface view included in the first user interface set of the first functional area of the media service, a second predefined user input associated with the second navigational option and different from the first predefined user input and provided by way of the user computing device; and
providing, by the computer-implemented media service system for display in the graphical user interface view included in the first user interface set of the first functional area of the media service and in response to the detecting of the second predefined user input associated with the second navigational option, the activity indicator indicating a tracked activity associated with the second functional area of the media service,
wherein
the activity indicator is provided for display in the graphical user interface view included in the first user interface set of the first functional area of the media service without changing the graphical user interface view included in the first user interface set of the first functional area of the media service, and
the activity indicator includes a selectable option associated with the tracked activity and configured to allow a user, upon selection of the selectable option, to interact with a feature included in the second set of features associated with the second functional area without activating the second functional area to the active status.

19. The method of claim 18, embodied as computer-executable instructions on at least one non-transitory computer-readable medium.

20. A system comprising:
at least one physical computing device that:
provides a plurality of functional areas of a media service, the plurality of functional areas comprising a first functional area including a first set of features accessible by way of a first user interface set and a second functional area including a second set of features accessible by way of a second user interface set;
provides, when the first functional area has an active status, a graphical user interface view included in the first user interface set of the first functional area of the media service for display on a display screen associated with a user computing device, the graphical user interface view including a menu of navigational options that includes
a first navigational option representing the first functional area of the media service, and
a second navigational option representing the second functional area of the media service and configured, upon selection of the second navigational option by a first predefined user input associated with the second navigational option, to activate the second functional area to the active status;
detects, while the graphical user interface view included in the first user interface set of the first functional area of the media service is displayed, a second predefined user input associated with the second navigational option and different from the first predefined user input and provided by way of the user computing device; and provides, for display in the graphical user interface view included in the first user interface set of the first functional area of the media service and in response to the detecting of the second predefined user input associated with the second navigational option, an activity indicator indicating a tracked activity associated with the second functional area of the media service, wherein the activity indicator is provided for display in the graphical user interface view included in the first user interface set of the first functional area of the media service without changing the graphical user interface view included in the first user interface set of the first functional area of the media service, and the activity indicator includes a selectable option associated with the tracked activity and configured to allow a user, upon selection of the selectable option, to interact with a feature included in the second set of features associated with the second functional area without activating the second functional area to the active status.

21. The system of claim 20, wherein the at least one physical computing device is included in at least one of a server computing system operated by a provider of the media service and the user computing device operated by an end user of the media service.

\* \* \* \* \*